(12) United States Patent
Suzuki

(10) Patent No.: US 10,191,277 B2
(45) Date of Patent: Jan. 29, 2019

(54) MICROSCOPY SYSTEM, DETERMINATION METHOD, AND RECORDING MEDIUM

(71) Applicant: OLYMPUS CORPORATION, Tokyo (JP)

(72) Inventor: Shingo Suzuki, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 98 days.

(21) Appl. No.: 15/205,028

(22) Filed: Jul. 8, 2016

(65) Prior Publication Data

US 2017/0017070 A1 Jan. 19, 2017

(30) Foreign Application Priority Data

Jul. 16, 2015 (JP) ................................ 2015-141965

(51) Int. Cl.
*H04N 5/225* (2006.01)
*G02B 27/00* (2006.01)
(Continued)

(52) U.S. Cl.
CPC ....... *G02B 27/0068* (2013.01); *G02B 21/367* (2013.01); *G02B 21/0036* (2013.01); *G02B 21/025* (2013.01)

(58) Field of Classification Search
CPC .............. G02B 27/0068; G02B 21/367; G02B 21/0036; G02B 21/025
(Continued)

(56) References Cited

U.S. PATENT DOCUMENTS 5,270,860 A 12/1993 Suzuki
6,525,875 B1 2/2003 Lauer
(Continued)

FOREIGN PATENT DOCUMENTS

EP 2 770 360 A2 8/2014
EP 3 035 104 A2 6/2018
(Continued)

OTHER PUBLICATIONS

Extended European Search Report dated Nov. 17, 2016 in related European Patent Application No. 16 17 8657.9.
(Continued)

*Primary Examiner* — Michael Lee
(74) *Attorney, Agent, or Firm* — Scully, Scott, Murphy & Presser, P.C.

(57) ABSTRACT

A microscopy system includes a microscope apparatus. The microscope apparatus has an objective and a correction device correcting for a spherical aberration, and obtains image data. The microscopy system further includes an estimator that estimates, on the basis of information on a medium placed between the objective and an observation target plane, an amount of spherical aberration that occurs in the microscope apparatus. The microscopy system determines, by use of a contrast value calculated from the image data obtained by the microscope apparatus and an amount of spherical aberration that is estimated by the estimator, a target set value that is a set value of the correction device, the set value corresponding to the amount of spherical aberration that occurs in the microscope apparatus.

11 Claims, 35 Drawing Sheets

(51) Int. Cl.
*G02B 21/36* (2006.01)
*G02B 21/02* (2006.01)
*G02B 21/00* (2006.01)

(58) Field of Classification Search
USPC .......................................................... 348/80
See application file for complete search history.

(56) References Cited

U.S. PATENT DOCUMENTS

| | | | |
|---|---|---|---|
| 7,224,645 | B2 | 5/2007 | Ando et al. |
| 9,411,142 | B2 | 8/2016 | Ue et al. |
| 2002/0036823 | A1 | 3/2002 | Shimada et al. |
| 2003/0029999 | A1 | 2/2003 | Hosokawa |
| 2003/0063379 | A1 | 4/2003 | Fukuyama et al. |
| 2003/0184855 | A1 | 10/2003 | Yasuda et al. |
| 2005/0024718 | A1 | 2/2005 | Sase et al. |
| 2005/0046930 | A1 | 3/2005 | Olschewski |
| 2005/0083517 | A1 | 4/2005 | Asad et al. |
| 2005/0213204 | A1 | 9/2005 | Kei |
| 2006/0007557 | A1 | 1/2006 | Davidson |
| 2006/0098213 | A1 | 5/2006 | Itoh et al. |
| 2009/0231692 | A1 | 9/2009 | Yoshida et al. |
| 2010/0141752 | A1 | 6/2010 | Yamada et al. |
| 2011/0102572 | A1 | 5/2011 | Kihara et al. |
| 2011/0141260 | A1 | 6/2011 | Ouchi et al. |
| 2011/0272578 | A1* | 11/2011 | Hirose .................. H01J 37/153 250/310 |
| 2014/0231666 | A1* | 8/2014 | Akima .................. H01J 37/153 250/396 R |
| 2014/0233094 | A1 | 8/2014 | Ue et al. |
| 2015/0015871 | A1 | 1/2015 | Tamano |
| 2015/0253562 | A1 | 9/2015 | Kues et al. |
| 2016/0170193 | A1 | 6/2016 | Ue |
| 2017/0017070 | A1 | 1/2017 | Suzuki |

FOREIGN PATENT DOCUMENTS

| | | | |
|---|---|---|---|
| JP | H05-119263 | A | 5/1993 |
| JP | 3280402 | B2 | 5/2002 |
| JP | 2002-169101 | A | 6/2002 |
| JP | 2003-029152 | A | 1/2003 |
| JP | 2004-037581 | A | 2/2004 |
| JP | 2005-031507 | A | 2/2005 |
| JP | 2005-043624 | A | 2/2005 |
| JP | 2005-275199 | A | 10/2005 |
| JP | 2006-023476 | A | 1/2006 |
| JP | 2006-251209 | A | 9/2006 |
| JP | 2006-293219 | A | 10/2006 |
| JP | 2008-164834 | A | 7/2008 |
| JP | 2011-095685 | A | 5/2011 |
| JP | 2011-191617 | A | 9/2011 |
| JP | 2012-042525 | A | 3/2012 |
| JP | 4933706 | B2 | 5/2012 |
| JP | 2012-145788 | A | 8/2012 |
| JP | 2012145788 | A * | 8/2012 |
| JP | 2013-088138 | A | 5/2013 |
| JP | 2013-160815 | A | 8/2013 |
| JP | 2014-160213 | A | 9/2014 |
| JP | 2015-018045 | A | 1/2015 |
| WO | 2005/096062 | A1 | 10/2005 |
| WO | 2009/096522 | A1 | 8/2009 |
| WO | 2009/153919 | A1 | 12/2009 |

OTHER PUBLICATIONS

Brenner, John F. et al., "An Automated Microscope for Cytologic Research A Preliminary Evaluation", The Journal of Histochemistry and Cytochemistry (1976), vol. 24, No. 1, pp. 100-111.
Office Action dated Oct. 8, 2015 received in U.S. Appl. No. 14/180,189.
Notice of Allowance dated Apr. 25, 2016 received in U.S. Appl. No. 14/180,189.
Extended European Search Report dated Nov. 30, 2017 in European Patent Application No. 14 15 4835.4.
Japanese Office Action dated Dec. 6, 2016 received in Japanese Patent Application No. 2013-031483.
Office Action dated Jun. 25, 2018 received in U.S. Appl. No. 14/964,306.
Extended European Search Report dated Jun. 20, 2016 in European Patent Application No. 15 19 8629.6.
European Office Action dated Oct. 11, 2017 received in European Patent Application No. 15 198 629.6.
Bindel,D. "Maximizing an Interpolating Quadratic", Class Lecture 21, Intro to Scientific Computing (CS 3220), Apr. 9, 2012, 5 pages total. Retrieved from the Internet:URL:http://www.cs.cornell.edu/~bindel/class/cs3220-s12/notes/lec21.pdf [retrieved on Oct. 5, 2017].
Japanese Office Action dated Mar. 6, 2018 received in Japanese Patent Application No. 2014-253526.
Japanese Office Action dated Mar. 13, 2018 received in Japanese Patent Application No. 2014-253527.
Japanese Office Action dated Mar. 13, 2018 received in Japanese Patent Application No. 2014-253528.
Office Action dated May 18, 2018 received in U.S. Appl. No. 15/205,039.

* cited by examiner

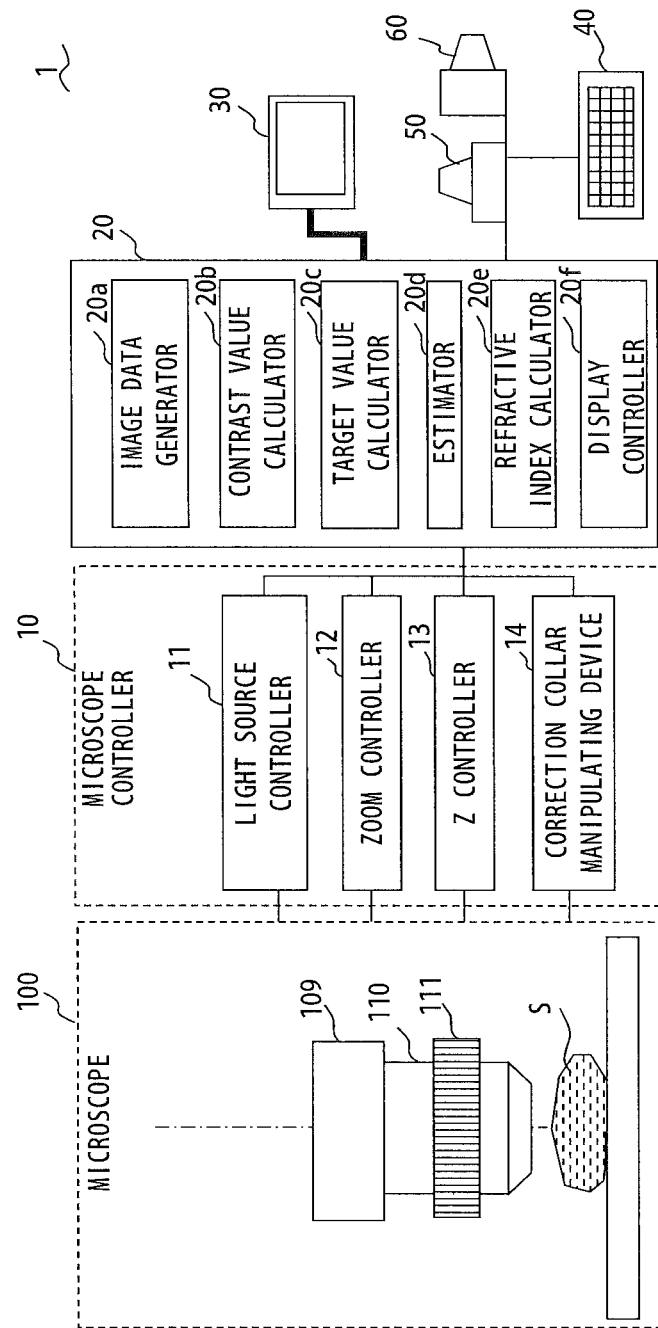
F I G. 1

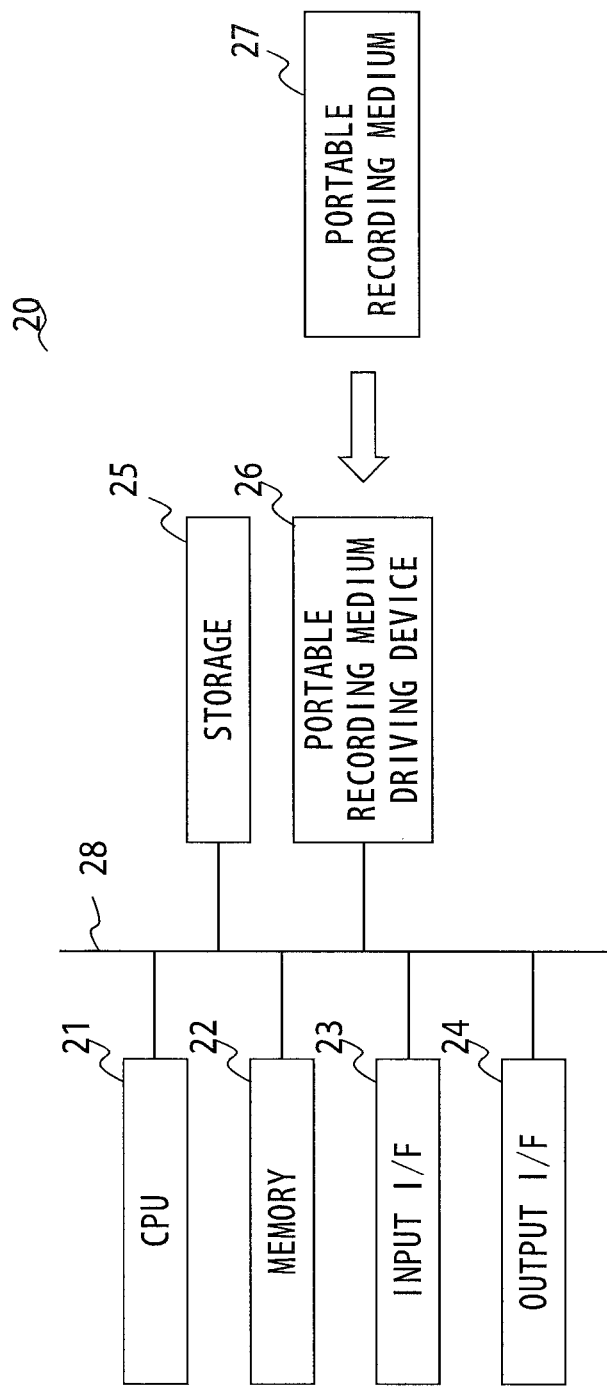
F I G. 2

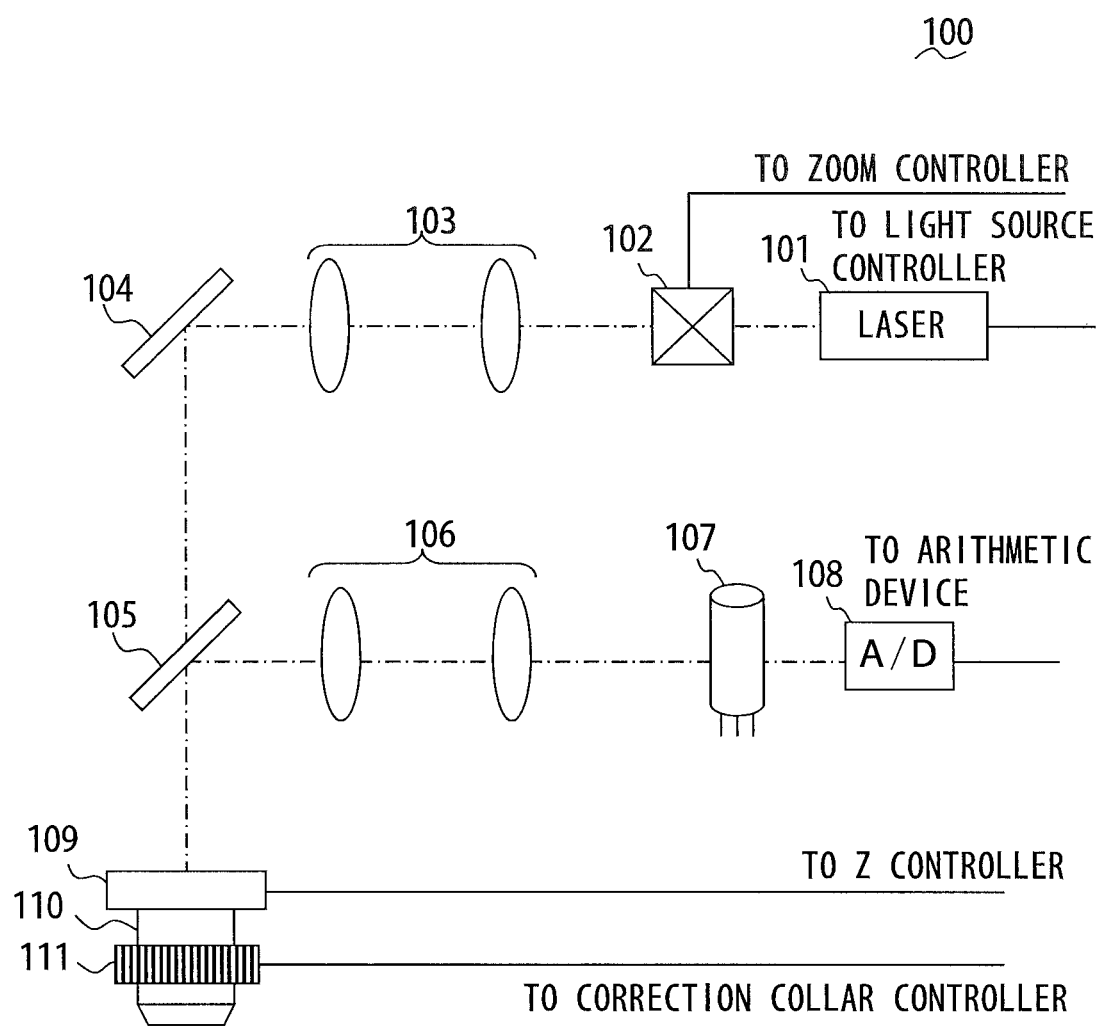
F I G. 3

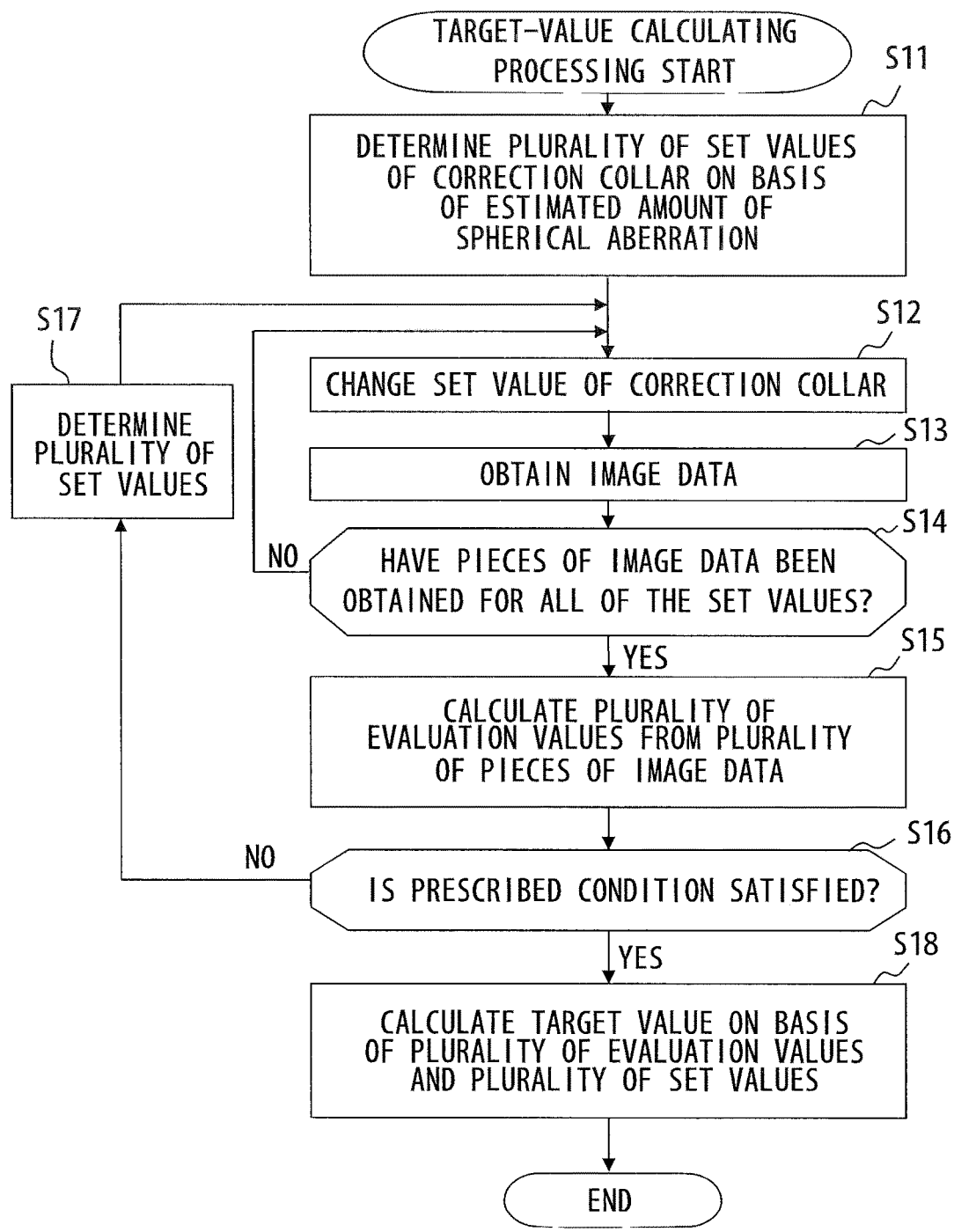
F I G. 5

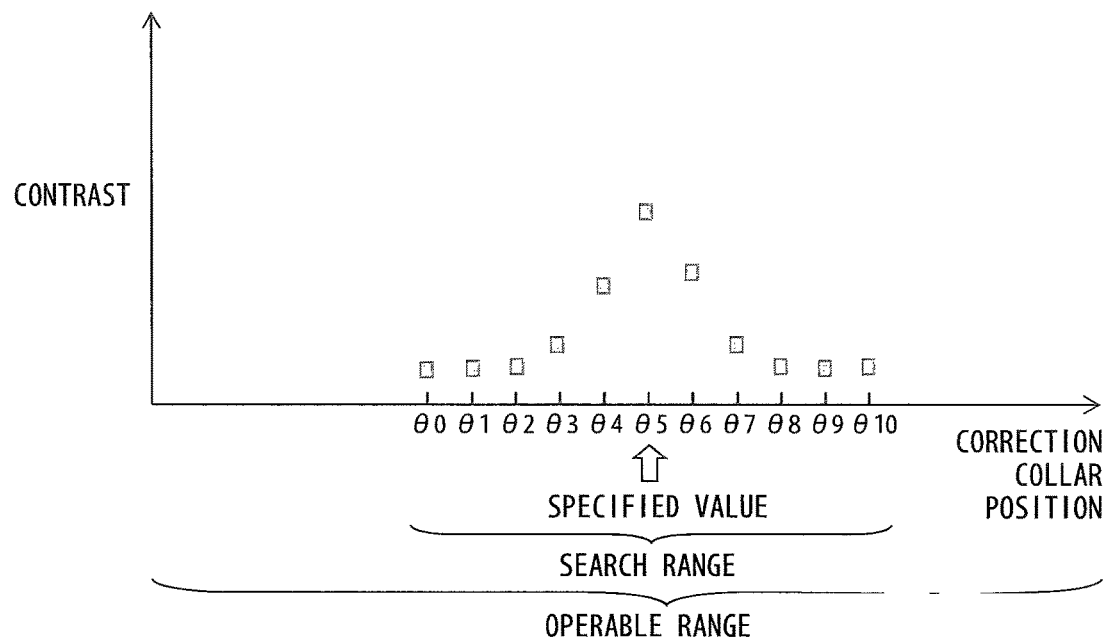
F I G. 6 A
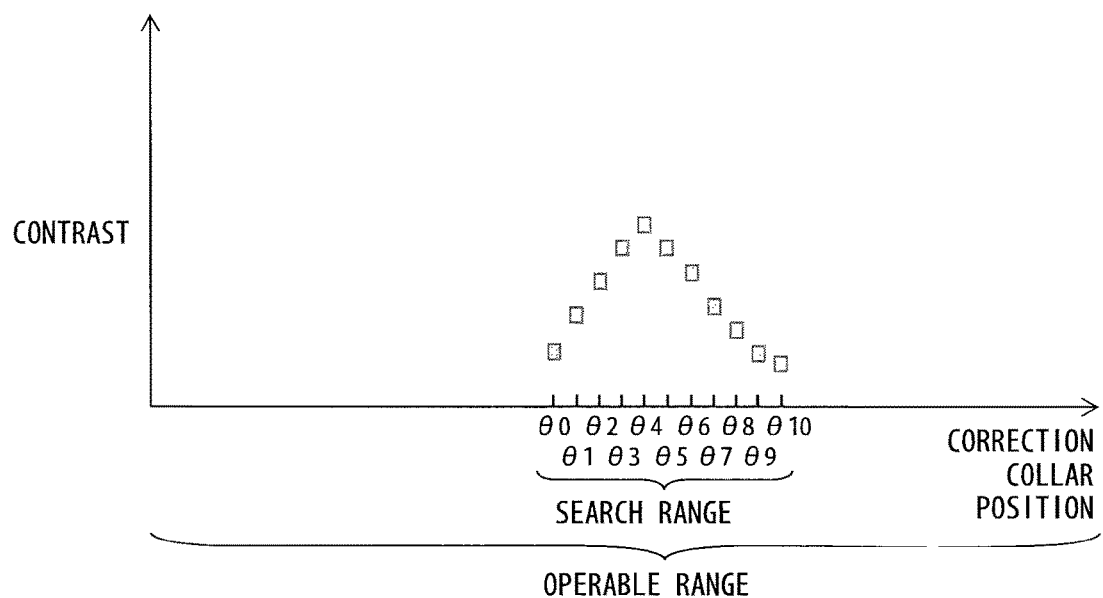
F I G. 6 B

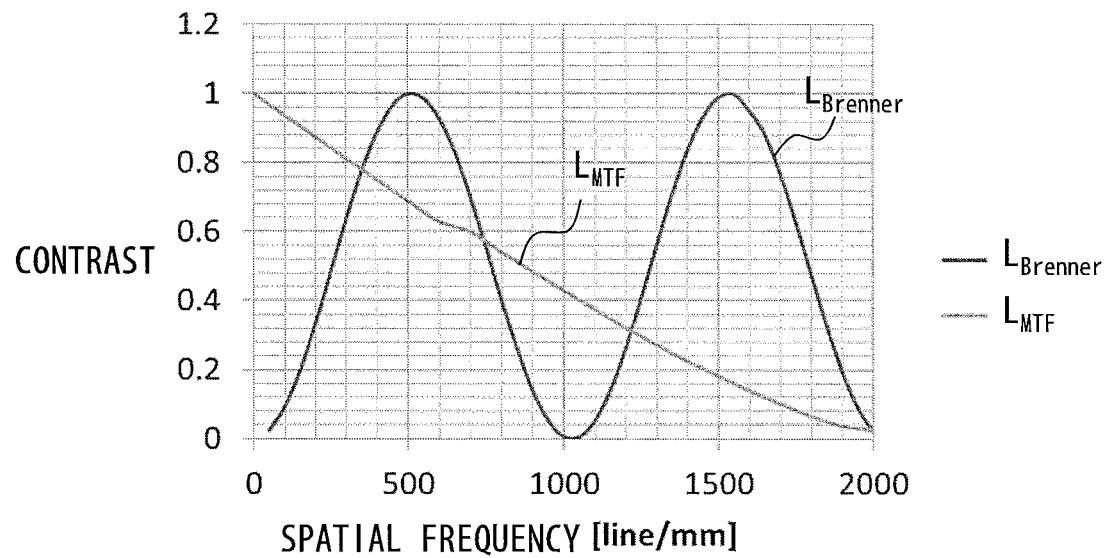
F I G. 7

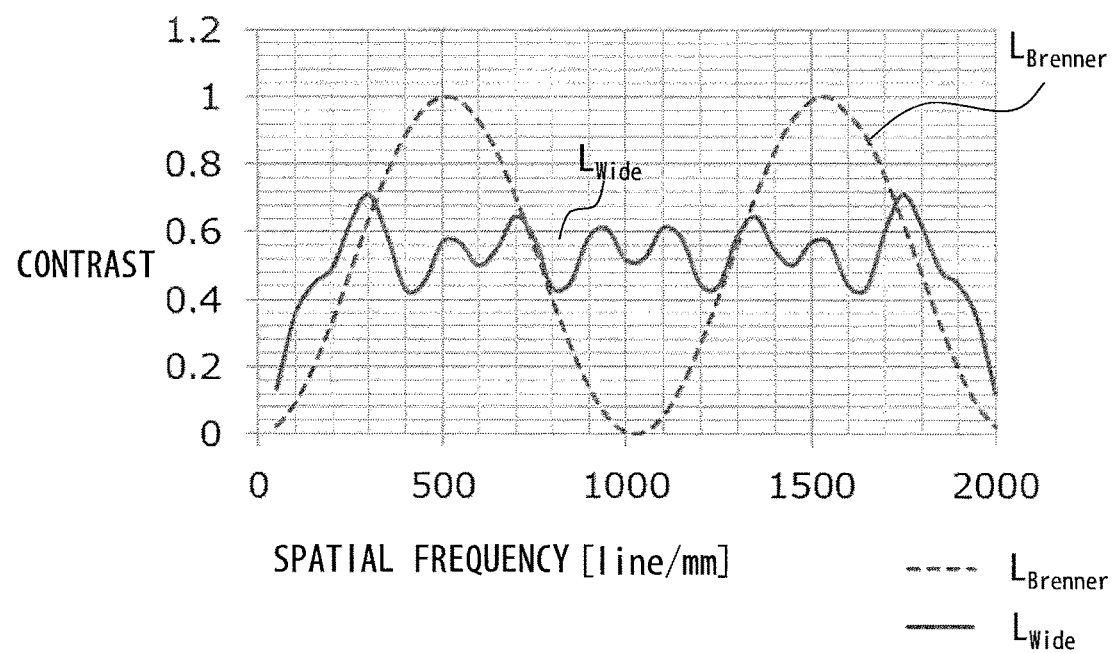
F I G. 8

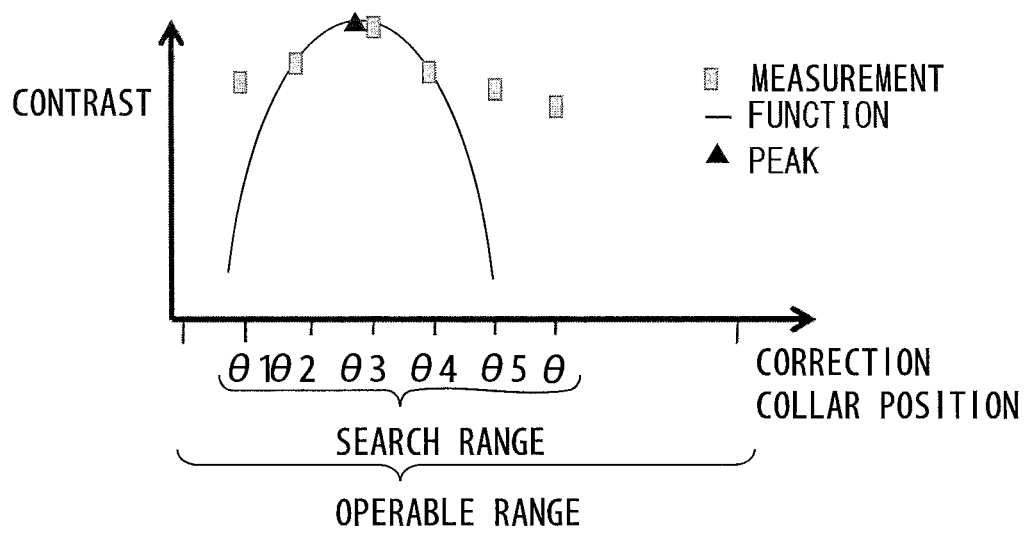
F I G. 11

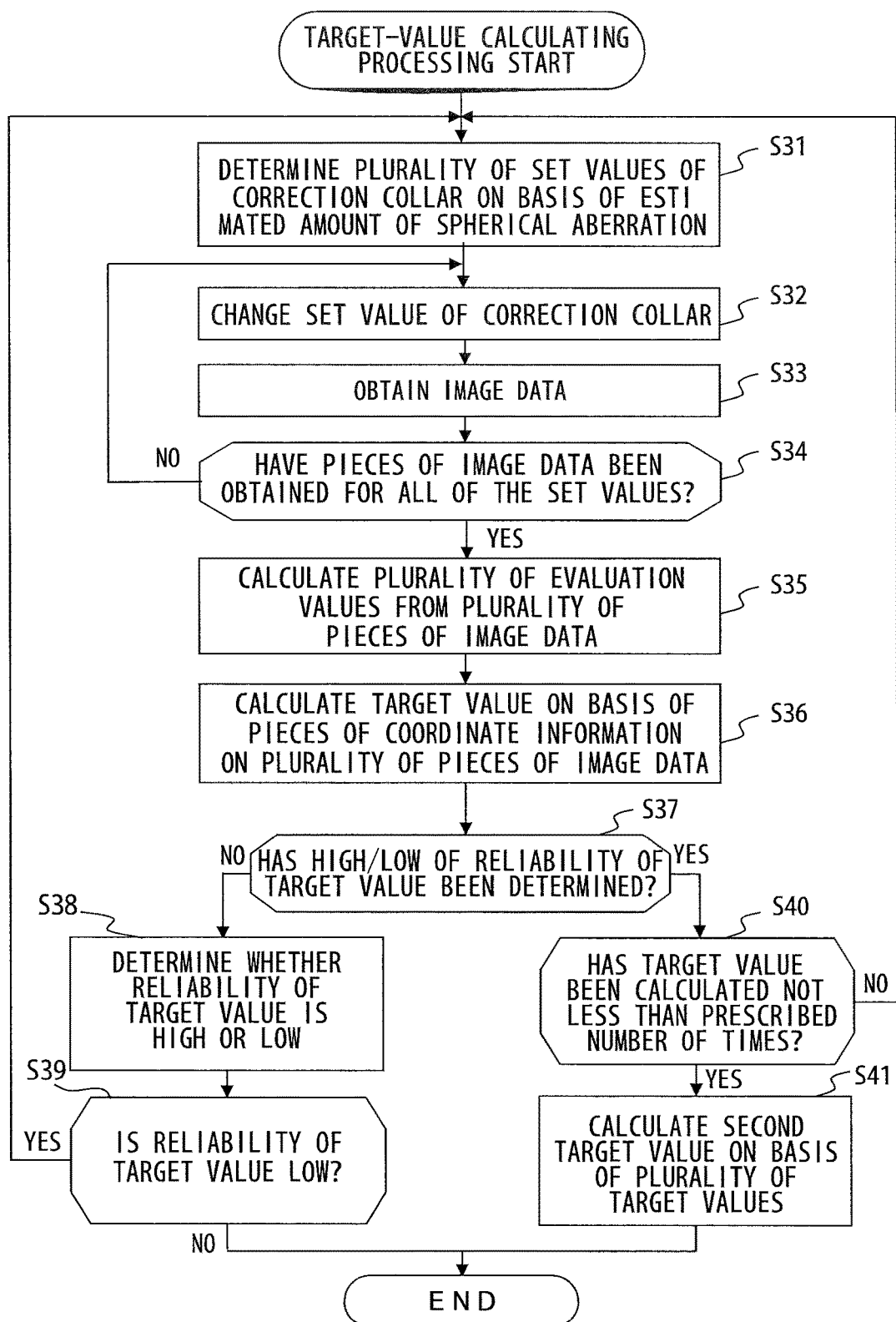
F I G. 12

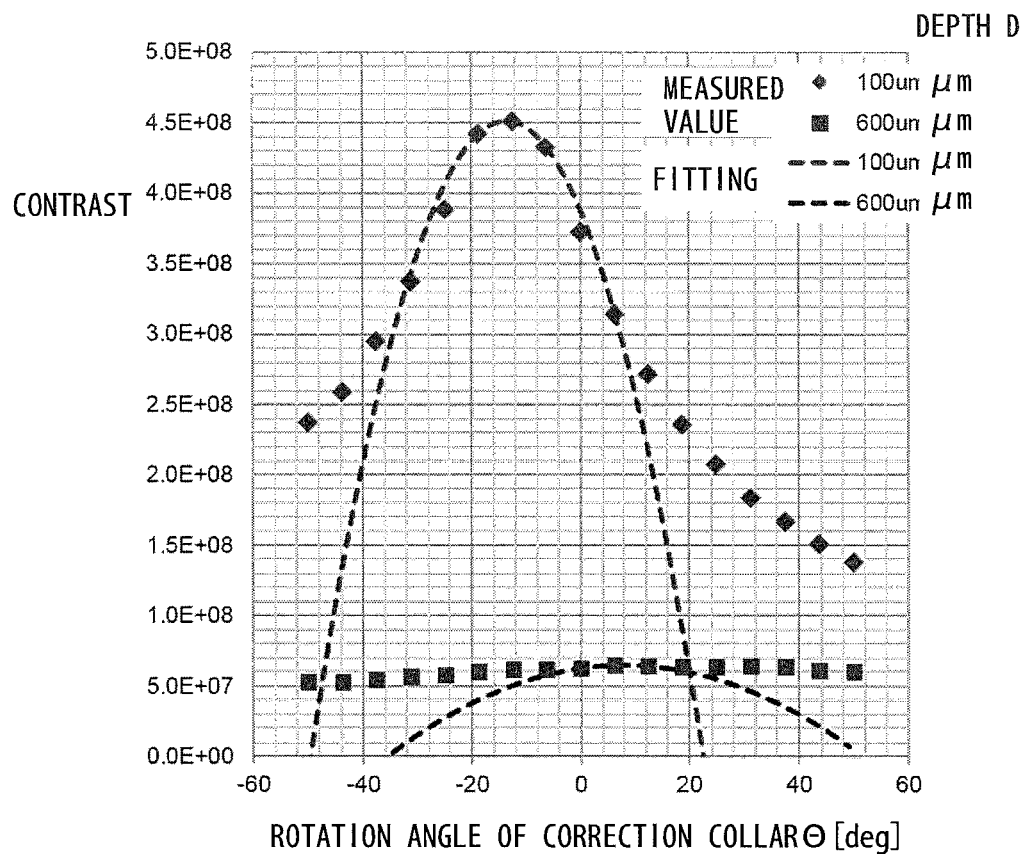
F I G. 13

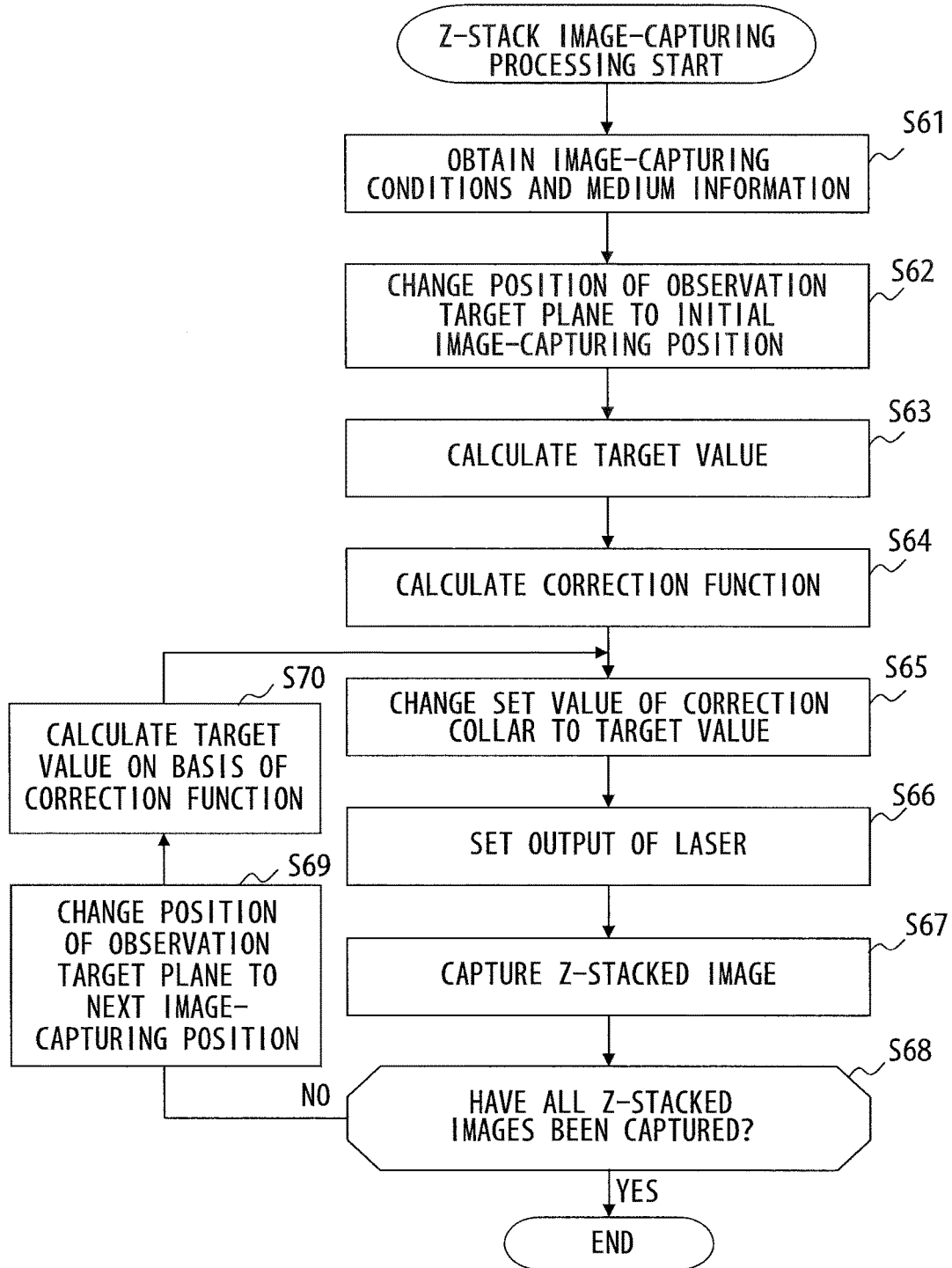
F I G. 17

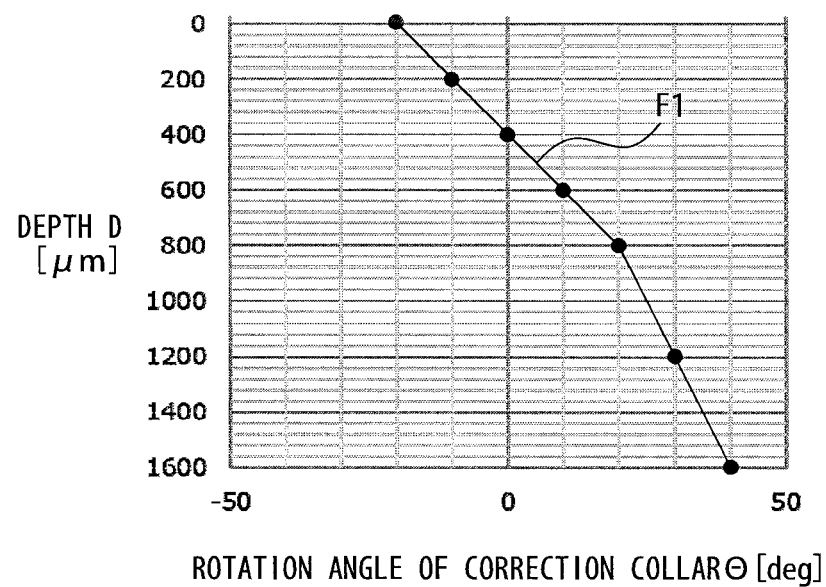
F I G. 1 8

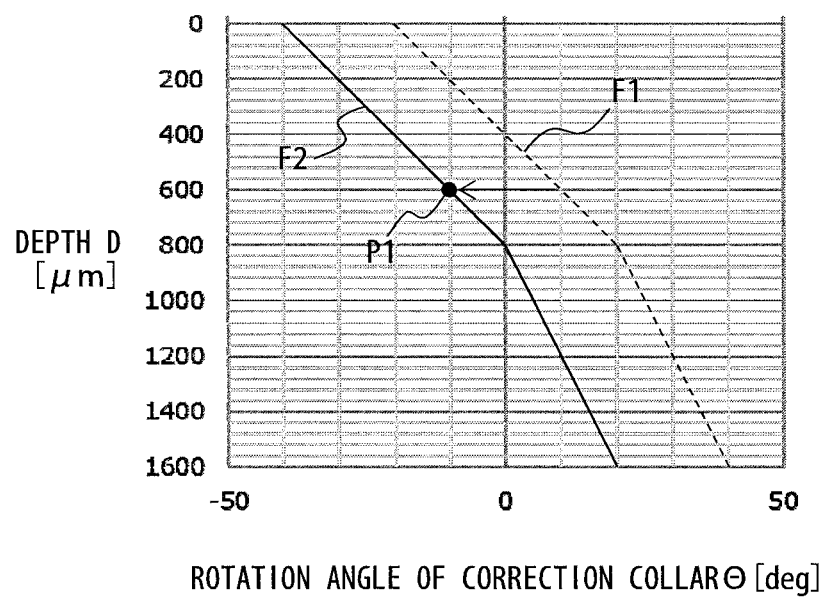
F I G. 19

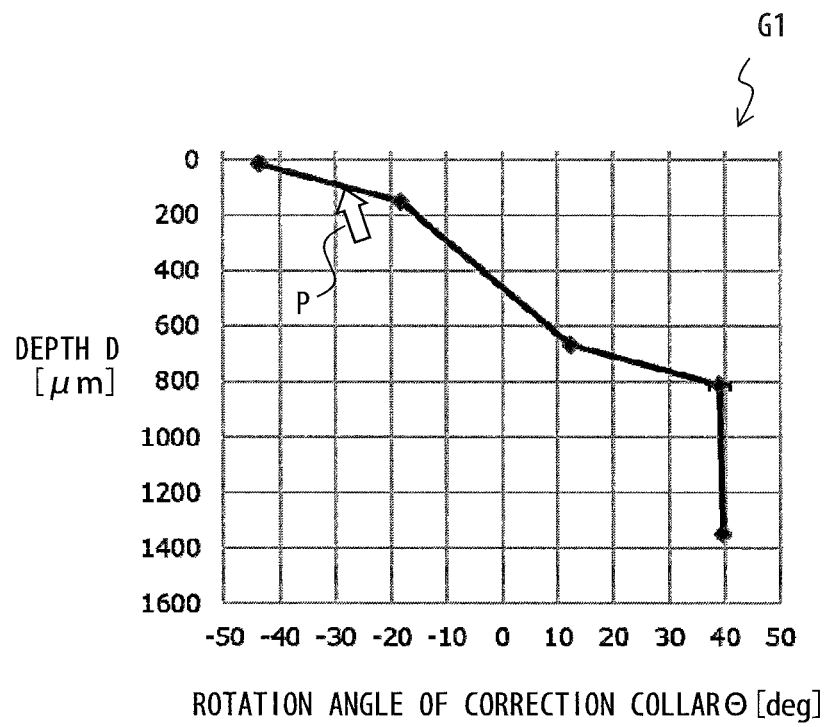
F I G. 23

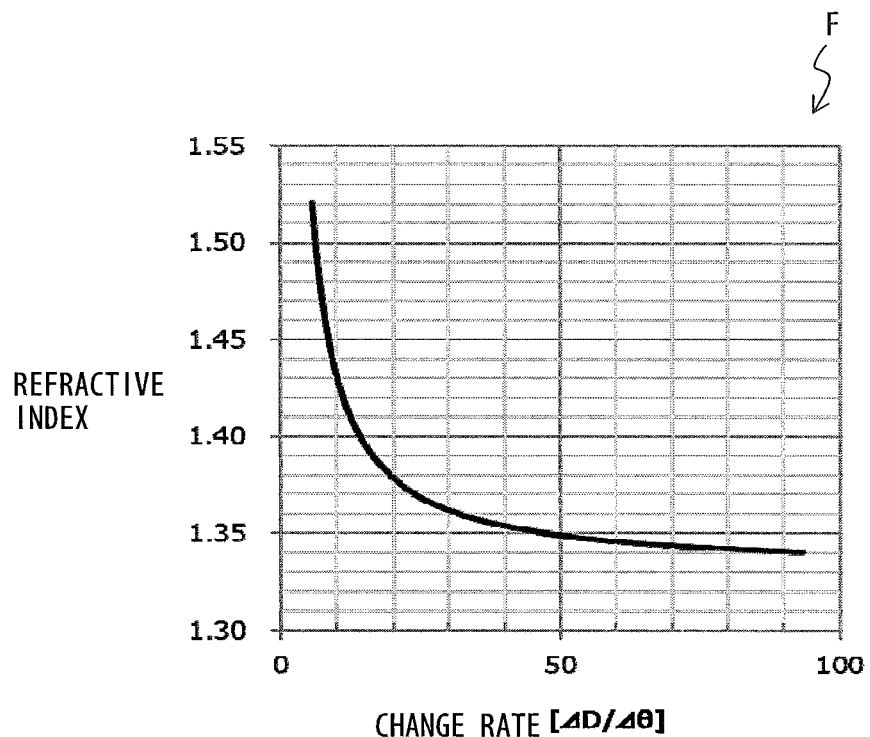
F I G. 2 5

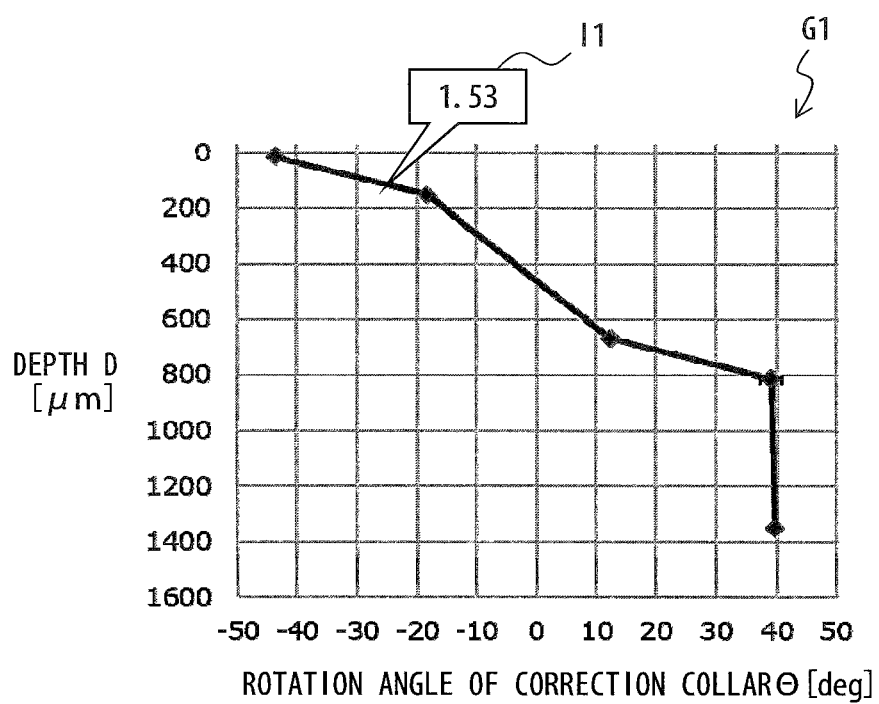
F I G. 26 A
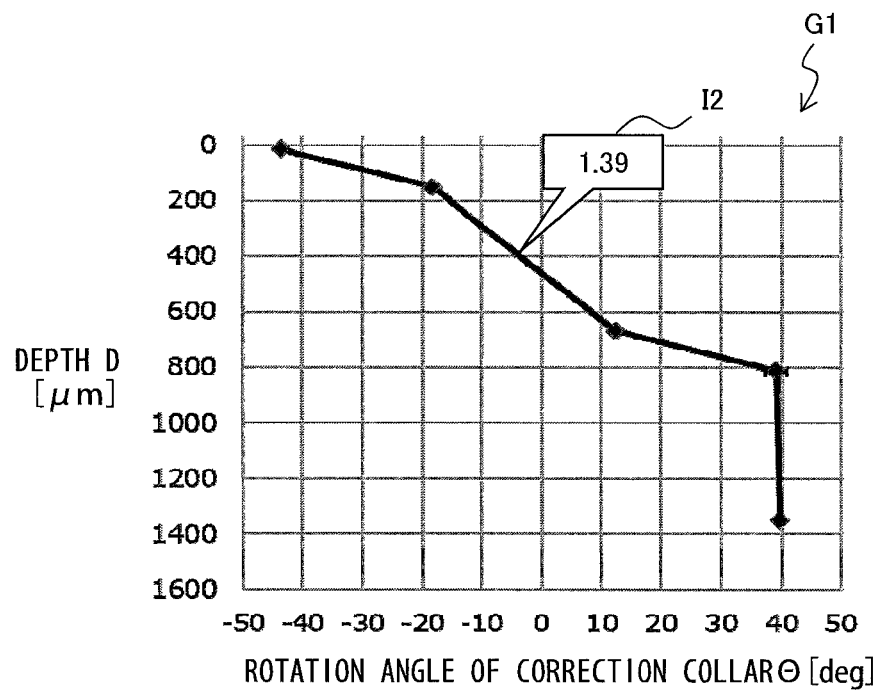
F I G. 26 B

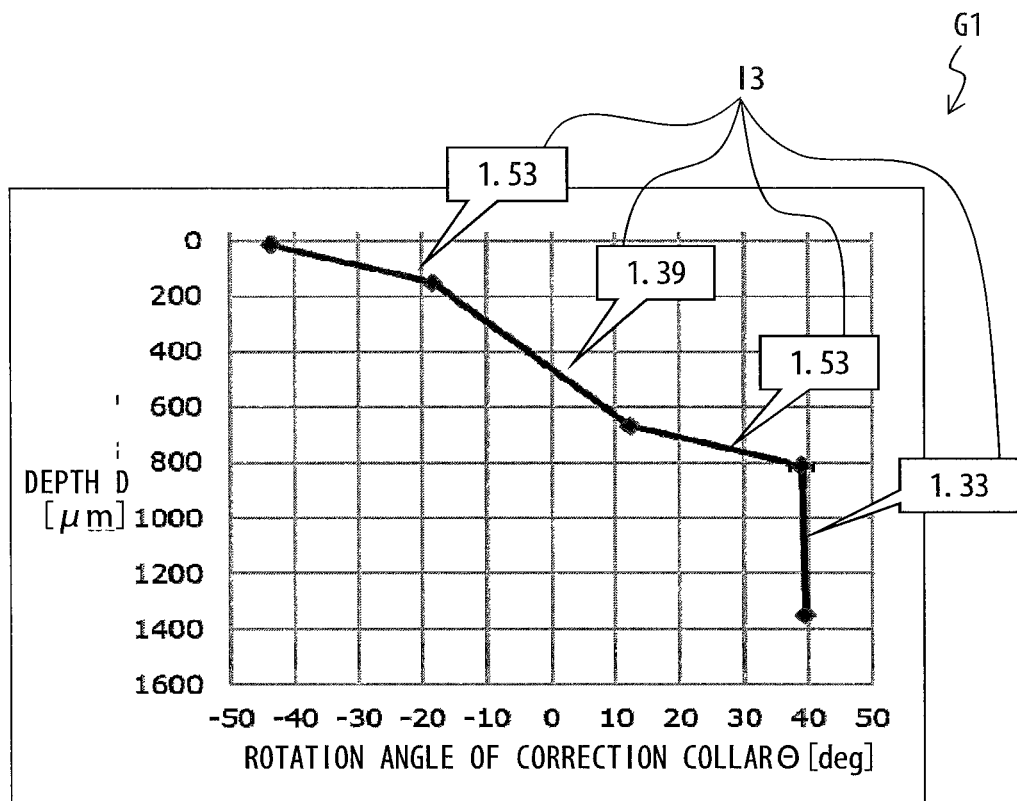
F I G. 27

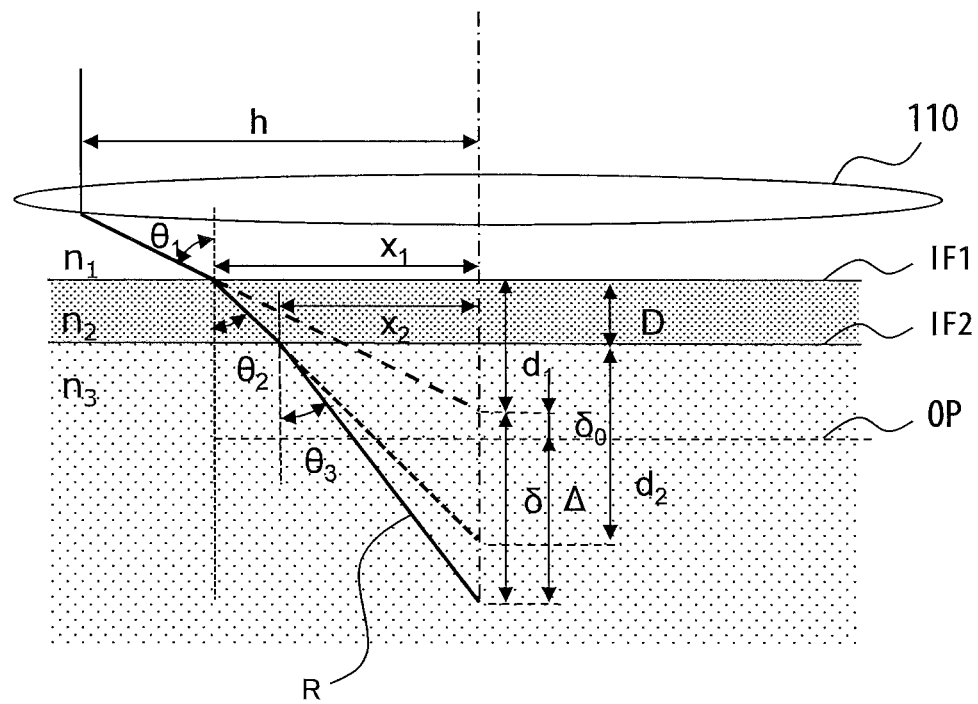
F I G. 28

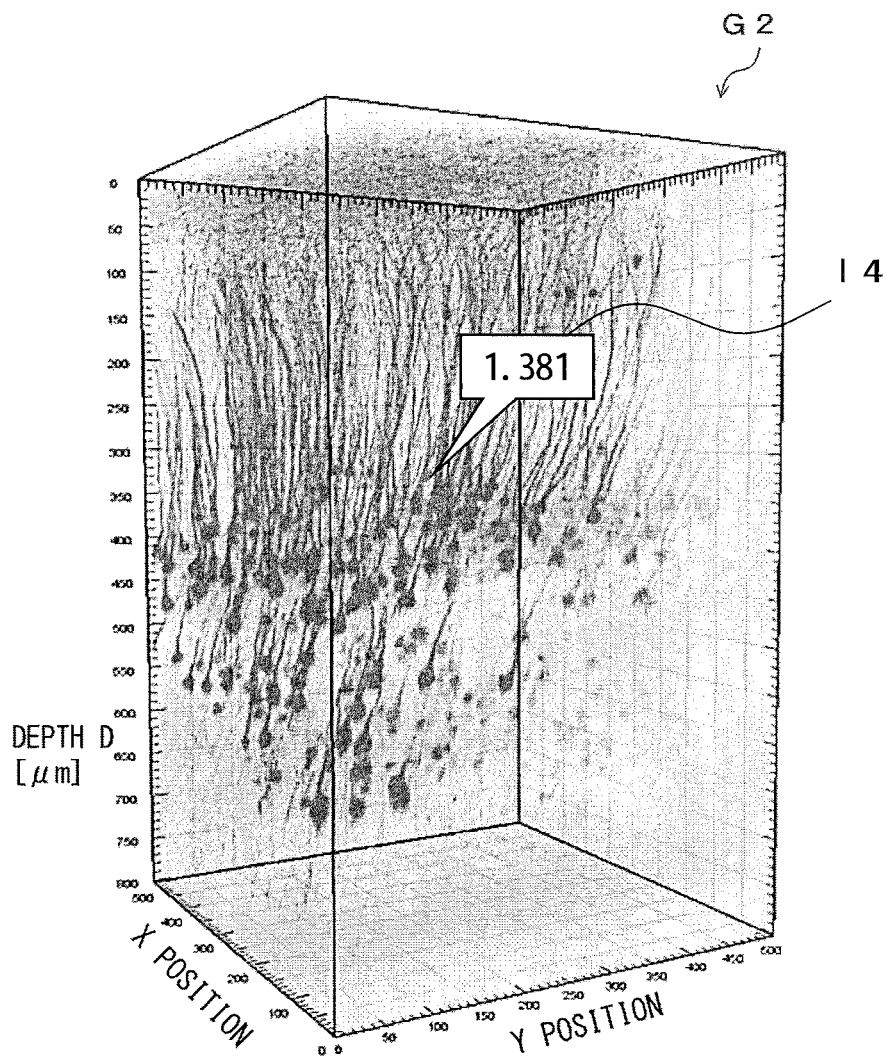
F I G. 3 1

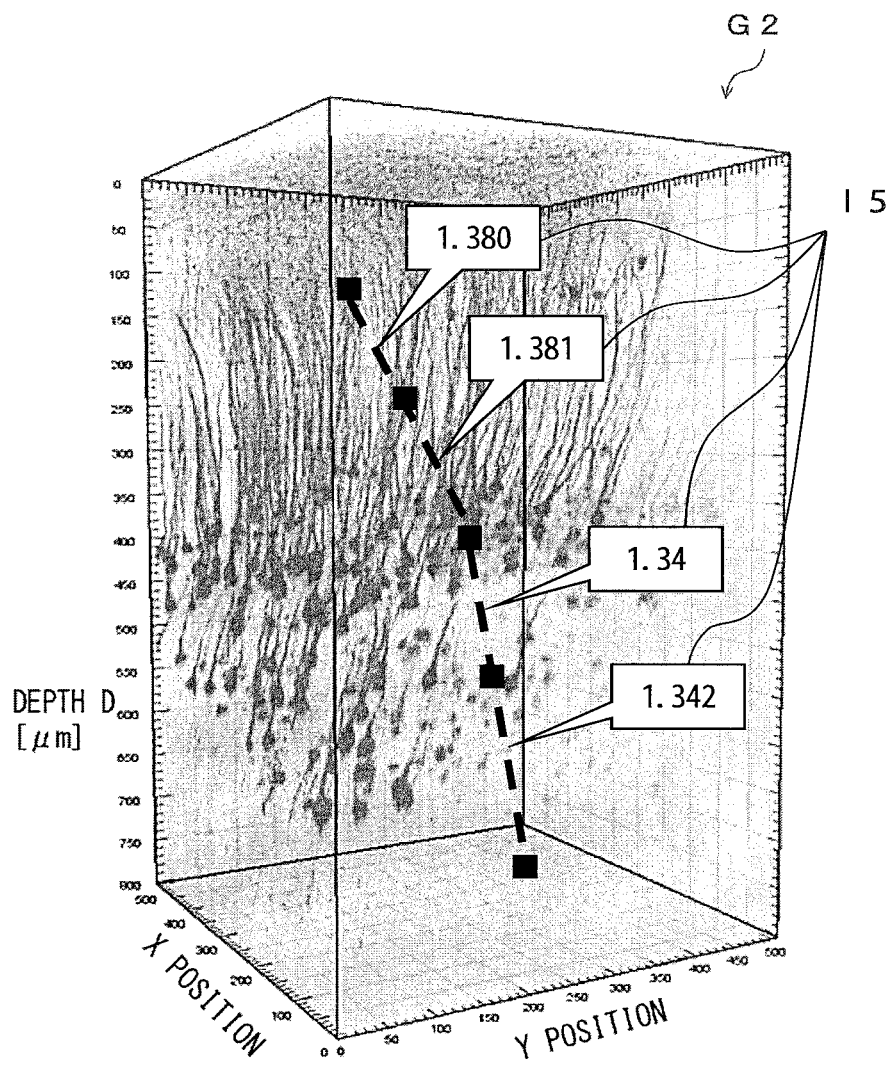
F I G. 3 2

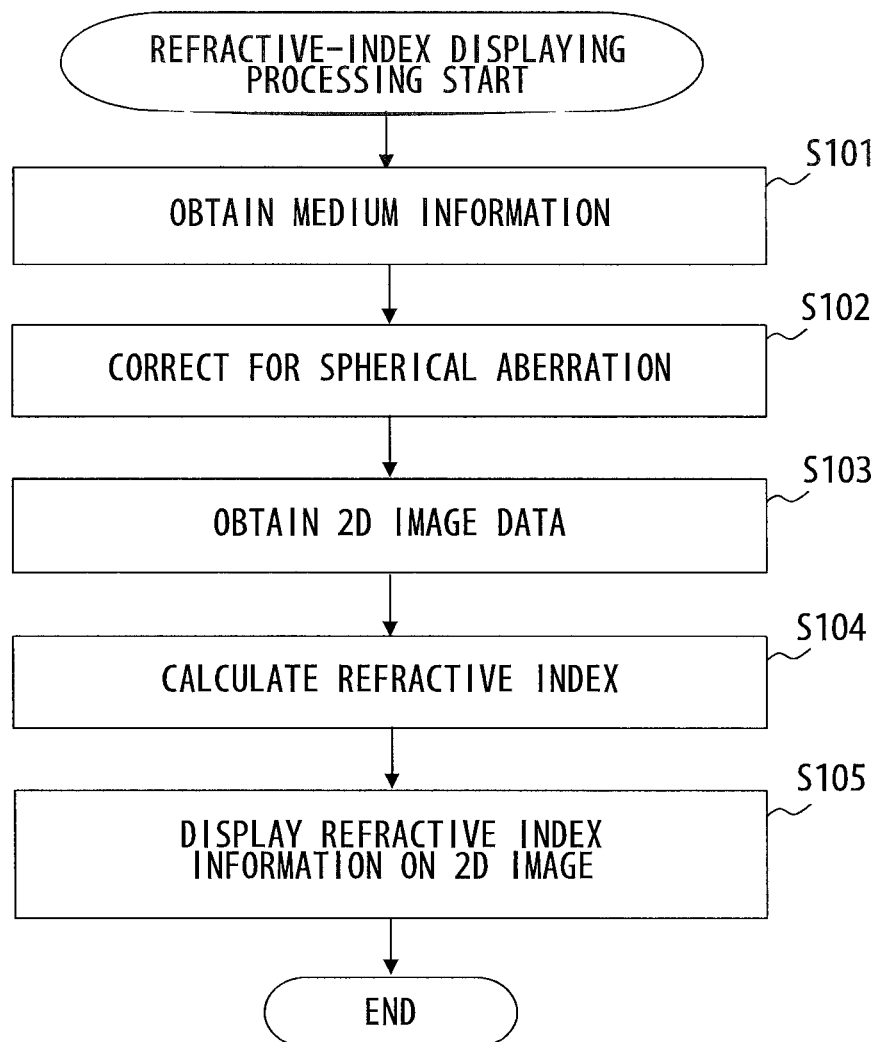
F I G. 3 3

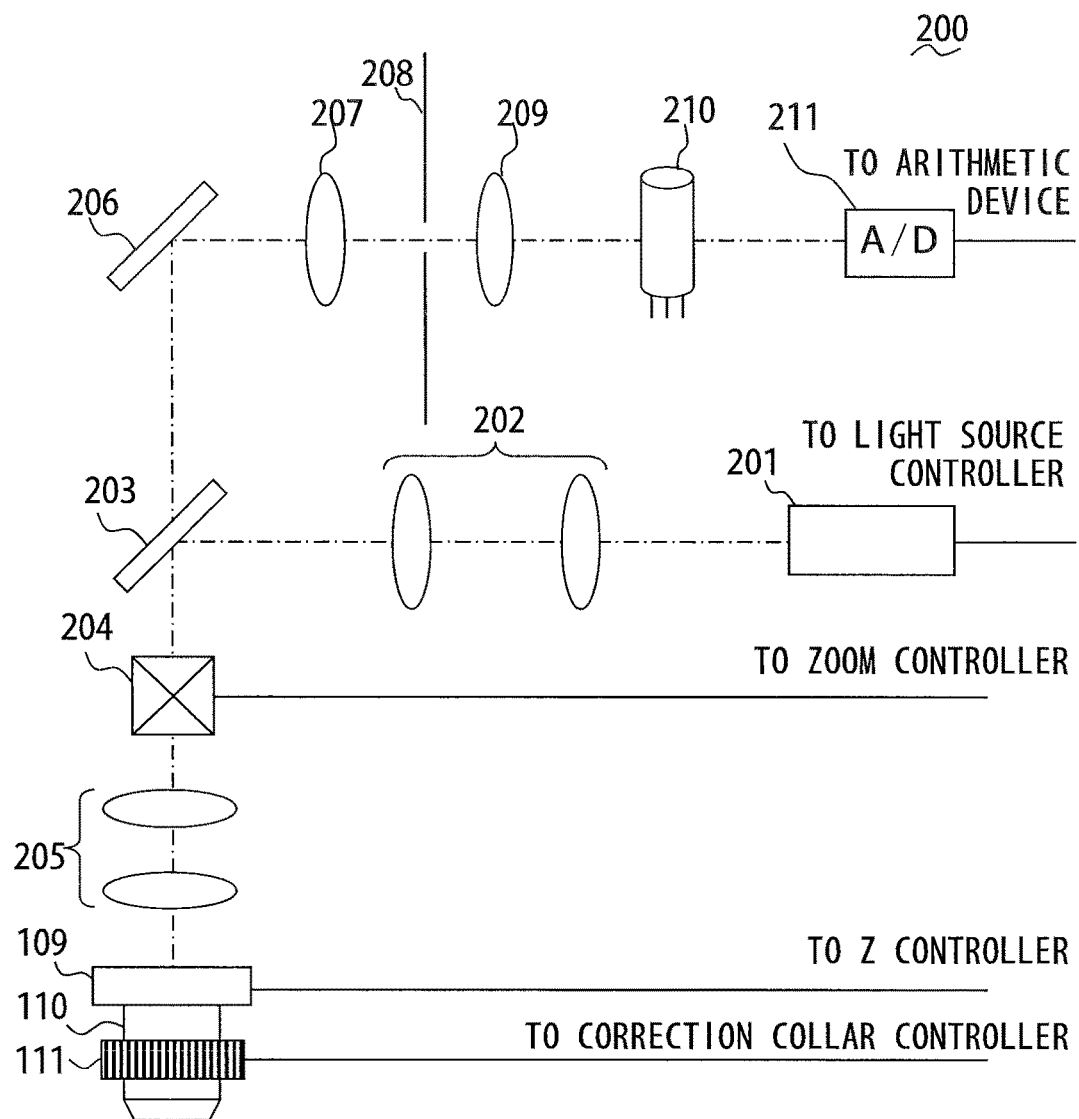
F I G. 34

MICROSCOPY SYSTEM, DETERMINATION METHOD, AND RECORDING MEDIUM

CROSS REFERENCE TO RELATED APPLICATIONS

This application is based upon and claims the benefit of priority from prior Japanese Patent Application No. 2015-141965, filed Jul. 16, 2015, the entire contents of which are incorporated herein by this reference. This application is related to U.S. application Ser. No. 15/205,039, filed on Jul. 8, 2016, the entire contents of which is incorporated herein by reference.

BACKGROUND OF THE INVENTION

Field of the Invention

The present invention relates to a microscopy system, a determination method for determining a set value of a correction device, provided in the microscopy system, which corrects for a spherical aberration, and a recording medium.

Description of the Related Art

An objective provided with a correction collar that corrects for a spherical aberration due to the thickness of a cover glass is known, for example, as described in Japanese Laid-open Patent Publication No. 05-119263. When there is a difference in refractive index between a sample and a medium that is filled in between the objective and the sample, the objective provided with a correction collar can also be used as means for correcting for a spherical aberration that varies according to the depth of an observation target plane.

An image having a higher contrast is obtained in a state in which a spherical aberration has been corrected, compared with a state in which a spherical aberration has not been corrected. Thus, it is possible to determine, on the basis of the contrast of an image, the setting of a correction collar in which a spherical aberration is corrected. Such a technology is described in, for example, Japanese Laid-open Patent Publication No. 2002-169101.

SUMMARY OF THE INVENTION

An aspect of the present invention provides a microscopy system including a microscope apparatus that has an objective and a correction device correcting for a spherical aberration and that obtains image data, and an estimator that estimates, on the basis of information on a medium placed between the objective and an observation target plane, an amount of spherical aberration that occurs in the microscope apparatus, wherein the microscopy system determines, by use of a contrast value calculated from the image data obtained by the microscope apparatus and an amount of spherical aberration that is estimated by the estimator, a target set value that is a set value of the correction device, the set value corresponding to the amount of spherical aberration that occurs in the microscope apparatus.

Another aspect of the present invention provides a determination method including obtaining image data using a microscope apparatus that has an objective and a correction device correcting for a spherical aberration, estimating, on the basis of information on a medium placed between the objective and an observation target plane, an amount of spherical aberration that occurs in the microscope apparatus, and determining, by use of a contrast value calculated from the image data and an estimated amount of spherical aberration, a set value of the correction device that corresponds to the amount of spherical aberration that occurs in the microscope apparatus.

Yet another aspect of the present invention provides a program that causes a computer to execute a process including calculating a contrast value from image data obtained by a microscope apparatus that has an objective and a correction device correcting for a spherical aberration, estimating, on the basis of information on a medium placed between the objective and an observation target plane, an amount of spherical aberration that occurs in the microscope apparatus, and determining, by use of the contrast value calculated from the image data and an estimated amount of spherical aberration, a set value of the correction device that corresponds to the amount of spherical aberration that occurs in the microscope apparatus.

BRIEF DESCRIPTION OF THE DRAWINGS

The present invention will be more apparent from the following detailed description when the accompanying drawings are referenced.

FIG. 1 illustrates an example of a configuration of a microscopy system according to a first embodiment;

FIG. 2 illustrates an example of a configuration of an arithmetic device of FIG. 1;

FIG. 3 illustrates an example of a configuration of a microscope of FIG. 1;

FIG. 5 is a flowchart of target-value calculating processing;

FIG. 6A illustrates a plurality of evaluation values obtained according to a plurality of set values that are determined initially in the target-value calculating processing;

FIG. 6B illustrates a plurality of evaluation values obtained according to a plurality of set values that are determined at the second time in the target-value calculating processing;

FIG. 7 illustrates an example of a relationship between spatial frequency characteristics of a conventional contrast evaluation equation and a modulation transfer function of an optical system;

FIG. 8 illustrates a comparison between spatial frequency characteristics of a contrast evaluation equation used in the microscopy system and the spatial frequency characteristics of a conventional contrast evaluation equation;

FIG. 11 is a diagram for explaining the target-value calculating processing of FIG. 10;

FIG. 12 is a flowchart of yet another target-value calculating processing;

FIG. 13 is a diagram for explaining a relationship between the reliability of a target value and an evaluation value;

FIG. 17 is a flowchart of yet another Z-stack image-capturing processing;

FIG. 18 illustrates an example of an estimation function;

FIG. 19 illustrates an example of a correction function;

FIG. 23 illustrates an example of a graph displayed on a display device of FIG. 1;

FIG. 25 illustrates a relationship between a change rate and a refractive index;

FIG. 26A illustrates a graph on which refractive index information at a target position is displayed;

FIG. 26B illustrates a graph on which refractive index information at a different target position than that of FIG. 26A is displayed;

FIG. 27 illustrates a graph on which refractive index information that indicates a refractive index distribution of the sample is displayed;

FIG. 28 is a diagram for explaining a method for calculating a refractive index;

FIG. 31 illustrates the three-dimensional image on which refractive index information at a target position is displayed;

FIG. 32 illustrates the three-dimensional image on which the refractive index information and a graph are displayed;

FIG. 33 is a flowchart of another refractive-index displaying processing;

FIG. 34 illustrates an example of a configuration of a microscopy system according to a second embodiment.

DESCRIPTION OF THE EMBODIMENTS

Figure 4:
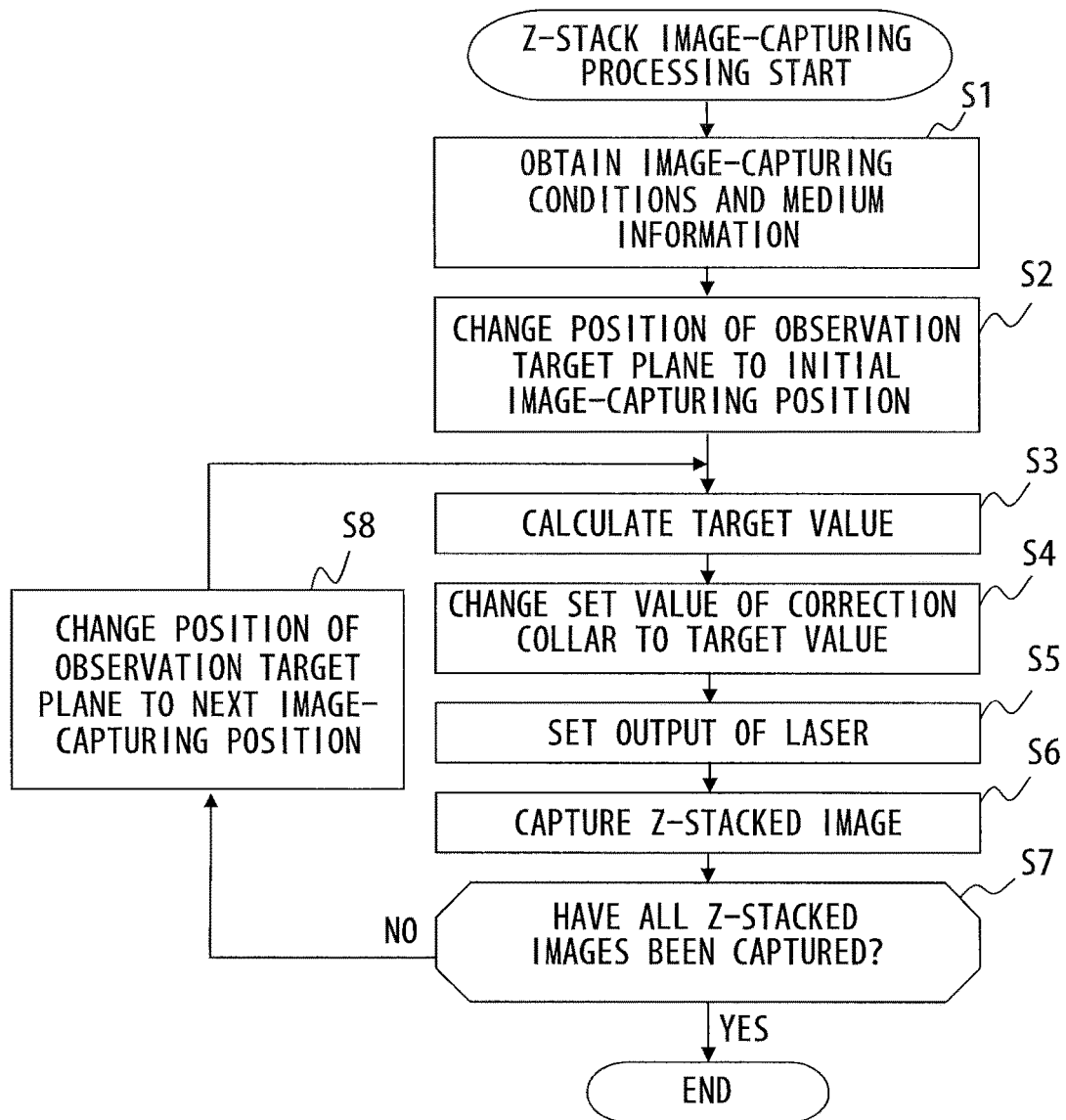
FIG. 4 is a flowchart of Z-stack image-capturing processing.

When conventional technologies are used, pieces of image data have to be obtained in a plurality of states in which different set values are set in a correction collar, in order to determine the setting of the correction collar in which a spherical aberration is corrected. Further, more pieces of image data are needed if determination is performed with a higher degree of accuracy. Furthermore, the setting of the correction collar in which a spherical aberration is corrected varies according to the depth of an observation target plane, so a plurality of pieces of image data have to be obtained again so as to determine the setting again every time the depth of an observation target plane is changed.

Thus, considering that it takes some time to obtain image data, it is understood that it is difficult to determine, in a short time, a setting of a correction collar that will provide a good correction for a spherical aberration. The correction collar is described as an example of means for correcting for a spherical aberration that varies according to the thickness of a cover glass or the depth of an observation target plane. However, there may occur a similar problem in any means for correcting a spherical aberration.

Embodiments of the present invention will now be described.

First Embodiment

FIG. 1 illustrates an example of a configuration of a microscopy system 1 according to the present embodiment. FIG. 2 illustrates an example of a configuration of an arithmetic device 20 of FIG. 1. FIG. 3 illustrates an example of a configuration of a microscope 100 of FIG. 1.

The microscopy system 1 of FIG. 1 includes the microscope 100, a microscope controller 10, the arithmetic device 20, a display device 30, and a plurality of input devices (a keyboard 40, a correction collar manipulating device 50, and a Z-driving-unit manipulating device 60) to input instructions to the arithmetic device 20.

The microscope controller 10 is a device that controls an operation of the microscope 100 according to an instruction issued by the arithmetic device 20. The microscope controller 10 generates a control signal that controls an operation of each electrically powered device of the microscope 100. The microscope controller 10 includes a light source controller 11 that controls an output of a light source, and a zoom controller 12 that controls a zoom magnification. The microscope controller 10 further includes a Z controller 13 that controls a position of an observation target plane in a direction of an optical axis (hereinafter simply referred to as a position of an observation target plane), and a correction collar manipulating device 14 that controls a set value of a correction collar 111. In this case, the set value of the correction collar 111 is, for example, a rotation angle of the correction collar 111 relative to a reference position.

The arithmetic device 20 is a computer that performs a variety of arithmetic processing. For example, as illustrated in FIG. 2, the arithmetic device 20 includes a CPU (central processing unit) 21, a memory 22, an input I/F device 23, an output I/F device 24, a storage 25, and a portable recording medium driving device 26 into which a portable recording medium 27 is inserted. These components are connected to one another through a bus 28. FIG. 2 illustrates an example of a configuration of the arithmetic device 20, and the arithmetic device 20 is not limited to this configuration.

The CPU 21 performs, for example, arithmetic processing by executing a prescribed program. The memory 22 is, for example, a RAM (random access memory) and temporarily stores therein a program or data stored in the storage 25 or the portable recording medium 27 upon execution of the prescribed program.

The input I/F device 23 receives a signal from the keyboard 40, the correction collar manipulating device 50, and the Z-driving-unit manipulating device 60, or from the display device 30. Further, the input I/F device 23 also receives a signal from an A/D converter 108 of the microscope 100 described later in FIG. 3. The output I/F device 24 outputs a signal to the display device 30 or the microscope controller 10.

The storage 25 is, for example, a hard disk storage and is mainly used to store various pieces of data or a program. The portable recording medium driving device 26 is used to accommodate the portable recording medium 27 such as an optical disk or a CompactFlash®, and the portable recording medium 27 has a role in assisting the storage 25.

The arithmetic device 20 realizes various functions by having the CPU 21 load a program stored in the storage 25 or the portable recording medium 27 into the memory 22 and execute the program. The arithmetic device 20 serves as, for example, means for generating image data on the basis of an output from the microscope 100 (an image data generator 20a). Further, the arithmetic device 20 operates as means for calculating a contrast value of image data (a contrast value calculator 20b) and means for calculating a target set value that is a set value of the correction collar 111, with which a spherical aberration is corrected (a target value calculator 20c). Furthermore, the arithmetic device 20 operates as means for estimating an amount of spherical aberration (an estimator 20d), means for calculating a refractive index of a sample S (a refractive index calculator 20e), and means for controlling the display device 30 (a display controller 20f).

The display device 30 is, for example, a liquid crystal display, an organic electroluminescent display, or a CRT display. The display device 30 may include a touch panel sensor, and in that case, the display device 30 also serves as an input device.

The keyboard 40 is an input device used to input information into the arithmetic device 20. According to a manipulation performed by a user, the keyboard 40 inputs, into the arithmetic device 20, information on a medium placed between the objective 110 and an observation target plane (such as a refractive index and a thickness in an optical-axis direction of the objective 110), the information being used when the arithmetic device 20 estimates an amount of spherical aberration. For example, the keyboard 40 inputs a refractive index of an immersion liquid between the objective 110 and the sample S, and further inputs a refractive index and a thickness of the sample S. Further, when it is assumed that the sample S has a multi-layered structure in which layers have different refractive indexes, the keyboard 40 inputs a refractive index and a thickness for each layer having a different refractive index. Furthermore, when a cover glass is used, the keyboard 40 inputs a refractive index and a thickness of the cover glass.

The correction collar manipulating device 50 is an input device for specifying a set value of the correction collar 111. When the user specifies a set value of the correction collar 111 using the correction collar manipulating device 50, the correction collar manipulating device 14 changes the set value of the correction collar 111 to the specified value. Instead of the correction collar manipulating device 50, the keyboard 40 may be used to indicate a set value of the correction collar 111.

The Z-driving-unit manipulating device 60 is an input device for instructing to change the position of an observation target plane. When the user instructs to change the position of an observation target plane using the Z-driving-unit manipulating device 60, the Z controller 13 moves a Z driving unit 109 in the optical-axis direction so as to change the position of an observation target plane.

The microscope 100 is a two-photon excitation microscope that is a type of scanning microscope. The sample S is, for example, a biological sample of a mouse brain, but it is not limited to the biological sample. As illustrated in FIG. 3, the microscope 100 includes, in an illumination light path, a laser 101, a scanning unit 102, a pupil-projection optical system 103, a mirror 104, a dichroic mirror 105, and the objective 110.

The laser 101 is, for example, an ultrashort pulsed laser, and emits a laser beam in a near infrared region. The output of the laser 101 is controlled by the light source controller 11. In other words, the light source controller 11 is a laser controller that controls a power of a laser beam that is irradiated onto a sample.

The scanning unit 102 is a scanner that two-dimensionally scans the sample S with a laser beam, and includes, for example, a galvanometer scanner or a resonant scanner. A zoom magnification changes if a scan range of the scanning unit 102 changes. The scan range of the scanning unit 102 is controlled by the zoom controller 12.

The pupil-projection optical system 103 is an optical system that projects the scanning unit 102 onto the objective 110 at its pupil position. The dichroic mirror 105 is a light separator that separates an excitation light (a laser beam) and a detected light (fluorescence) from the sample S, and separates a laser beam and fluorescence on the basis of a wavelength.

The objective 110 is a dry objective or an immersion objective provided with the correction collar 111, and is attached to the Z driving unit 109. The Z driving unit 109 is means for moving the objective 110 in the optical-axis direction of the objective 110, and the movement of the Z driving unit 109 (that is, the movement of the objective 110) is controlled by the Z controller 13.

The correction collar 111 is a correction device that moves a lens in the objective 110 by changing a set value of the correction collar 111, so as to correct for a spherical aberration. The set value of the correction collar 111 is changed by the correction collar manipulating device 14 (a correction-device controller). The set value of the correction collar 111 can also be manually changed by directly manipulating the correction collar 111.

The microscope 100 further includes a pupil-projection optical system 106 and a photodetector 107 in a detection light path (a reflection light path of the dichroic mirror 105). A signal output from the photodetector 107 is output to the A/D converter 108.

The pupil-projection optical system 106 is an optical system that projects a pupil of the objective 110 onto the photodetector 107. The photodetector 107 is, for example, a photomultiplier tube (PMT), and outputs an analog signal according to an amount of incident fluorescence. The A/D converter 108 converts an analog signal from the photodetector 107 into a digital signal (a brightness signal) and outputs it to the arithmetic device 20.

In the microscopy system 1 having the above-described configuration, the microscope 100 scans, using the scanning unit 102, the sample S with a laser beam in a direction perpendicular to the optical axis of the objective 110, and detects, using the photodetector 107, fluorescence from each position of the sample S. Then, the arithmetic device 20 generates image data on the basis of a digital signal (a brightness signal) obtained by converting a signal from the photodetector 107, and on the basis of a signal from the scanning unit 102. In other words, in the microscopy system 1, a microscope apparatus that is constituted of the microscope 100 and the arithmetic device 20 obtains image data of the sample S.

Z-stack image-capturing processing that includes correcting for a spherical aberration according to the depth of an observation target plane by use of the correction collar 111 and capturing a Z-stacked image in each observation target plane, and refractive-index displaying processing that includes calculating a refractive index of an arbitrary portion of the sample S and displaying information on the refractive index (hereinafter referred to as refractive index information) are described below.

FIG. 4 is a flowchart of the Z-stack image-capturing processing performed in the microscopy system 1. FIG. 5 is a flowchart of target-value calculating processing performed in the microscopy system 1. FIGS. 6A and 6B are diagrams for explaining the target-value calculating processing of FIG. 5. FIG. 6A illustrates a plurality of evaluation values obtained by using a plurality of set values that are determined initially. FIG. 6B illustrates a plurality of evaluation values obtained by using a plurality of set values that are determined at the second time. FIG. 7 illustrates an example of a relationship between spatial frequency characteristics of a conventional contrast evaluation equation and a modulation transfer function (hereinafter referred to as MTF) of an optical system. FIG. 8 illustrates a comparison between spatial frequency characteristics of a contrast evaluation equation used in the microscopy system 1 and the spatial frequency characteristics of a conventional contrast evaluation equation. The Z-stack image-capturing processing of FIG. 4 is described below with reference to FIGS. 4 to 8.

First, the microscopy system 1 obtains image-capturing conditions and medium information (Step S1). In this case, for example, using the keyboard 40, a user inputs a depth range and an interval in which a Z-stacked image is to be obtained. The arithmetic device 20 obtains the input depth range and interval as the image-capturing conditions, and determines, from these pieces of information, a plurality of positions of an observation target plane at which a Z-stacked image is to be obtained (hereinafter referred to as image-capturing position). The depth range is a range in the optical direction in which the observation target plane moves. The user further inputs a refractive index of the sample S using the keyboard 40. When the sample S is constituted of a plurality of layers respectively having different refractive indexes from one another, the user inputs a refractive index and a thickness for each layer. Further, when the objective 110 is an immersion objective, the user also inputs a refractive index of an immersion liquid. Furthermore, when a cover glass is used, the user also inputs a refractive index and a thickness of the cover glass. The arithmetic device 20 obtains these pieces of information as medium information.

Next, the microscopy system 1 changes the position of an observation target plane to an initial image-capturing position (Step S2). In this case, according to an instruction issued by the arithmetic device 20, the Z controller 13 moves the Z driving unit 109 in the optical-axis direction, so as to change the position of an observation target plane to the initial image-capturing position that is one of the plurality of image-capturing positions determined in Step S1.

When the position of an observation target plane is changed, the microscopy system 1 calculates a set value of the correction collar 111, with which the spherical aberration in the observation target plane determined in Step S2 is corrected (hereinafter referred to as a target set value, or simply referred to as a target value) (Step S3). The target value corresponds to an amount of spherical aberration that occurs in the microscope apparatus. In this case, on the basis of image data obtained by the microscope apparatus, the arithmetic device 20 performs the target-value calculating processing of FIG. 5. The depth of an observation target plane when image data that is used in the target-value calculating processing is obtained is referred to as a measured depth. The depth of an observation target plane is a distance in the optical-axis direction from the surface of the sample S to the observation target plane.

In the target-value calculating processing, the microscopy system 1 determines a plurality of set values of the correction collar 111 on the basis of an estimated amount of spherical aberration (Step S11). In this case, the arithmetic device 20 determines plural set values of the correction collar 111 when image data of the sample S is obtained by the microscope apparatus.

Specifically, in Step S11, a plurality of set values are determined in the following procedure. First, using the current position of an observation target plane and the medium information obtained in Step S1, the arithmetic device 20 determines the refractive index of the medium placed between the objective 110 and the observation target plane, and the thickness of the medium in the optical-axis direction of the objective 110. Then, the arithmetic device 20 estimates an amount of spherical aberration that occurs in the microscope apparatus on the basis of these pieces of information. In other words, the arithmetic device 20 is an estimator that estimates the amount of spherical aberration that occurs in the microscope apparatus. If the difference in refractive index between an immersion liquid (or air when the objective 110 is a dry objective) and the sample S is greater, if the depth of an observation target plane is greater, and if the difference between the thickness of a cover glass and a reference value is greater, a greater amount of spherical aberration is estimated to exist in the arithmetic device 20. Then, when the amount of spherical aberration is estimated, the arithmetic device 20 calculates, on the basis of correction collar information stored in the storage 25 in advance, a set value of the correction collar 111 that corresponds to the estimated amount of spherical aberration (hereinafter referred to as an estimation set value). The correction collar information is information that indicates a relationship between a set value of the correction collar 111 and a correction amount that is an amount of spherical aberration to be corrected by the correction collar 111. When the estimation set value is calculated, the arithmetic device 20 determines a search range including the estimation set value and determines, to be a plurality of set values, a predetermined number of (here, eleven) set values (correction collar positions), wherein the search range is equally divided into the predetermined number. In other words, the arithmetic device 20 determines the plurality of set values on the basis of the estimated amount of spherical aberration. FIG. 6A illustrates an example in which ten set values (correction collar positions) from θ0 to θ10 are determined.

Next, the microscopy system 1 changes the set value of the correction collar 111 to a set value determined in Step S11 (Step S12). In this case, according to an instruction issued by the arithmetic device 20, the correction collar manipulating device 14 sets the set value to one of the plurality of set values determined in Step S11. For example, the correction collar manipulating device 14 changes the set value of the correction collar 111 to θ0.

When the set value of the correction collar 111 is changed, the microscopy system 1 obtains image data of the sample S (Step S13). In this case, the microscope apparatus obtains the image data according to an instruction issued by the arithmetic device 20. For example, the microscope apparatus obtains image data in a state in which the set value of the correction collar 111 is θ0.

After that, the microscopy system 1 determines whether pieces of image data have been obtained for all of the set values determined in Step S11 (Step S14). When pieces of image data have not been obtained for all of the set values, the microscopy system 1 repeats the processes of Step S12 to Step S14. Accordingly, the microscope apparatus obtains image data of an observation target plane of the sample S in each of the plurality of states in which different set values are respectively set in the correction collar 111, so as to obtain a plurality of pieces of image data.

When pieces of image data have been obtained for all of the set values, the microscopy system 1 calculates a plurality of evaluation values from the plurality of pieces of image data obtained in Step S13 (Step S15). In this case, using an evaluation equation for evaluating a contrast of an image on the basis of a difference in pixel values (brightness value) between pixels, the arithmetic device 20 calculates a plurality of contrast values from the plurality of pieces of image data. In general, an image having a corrected spherical aberration has a higher contrast, so the contrast value is suitable as an evaluation value for evaluating whether a spherical aberration has been corrected.

As an evaluation equation for evaluating a contrast of an image, for example, the following formula that calculates a contrast value by integrating, over the entirely of image data, the square of a difference in pixel values between two pixels that are situated in positions shifted from each other by n pixels in an x-direction is known. The following formula is an evaluation equation that has been proposed by J. F. Brenner and others, and is called the Brenner gradient.

$$F_{Brenner} = \sum_{y=1}^{H} \sum_{x=1}^{W-n} \{f(x, y) - f(x+n, y)\}^2 \quad (1)$$

Here, $F_{Brenner}$ is a contrast value. x is a variable that identifies a column of pixels that constitute the image data. y is a variable that identifies a row of pixels that constitute the image data. W is the number of pixels (that is, the number of columns of pixels), in the x-direction, that constitute the image data. H is the number of pixels (that is, the number of rows of pixels), in a y-direction, that constitute the image data. f is a pixel value. n is a shift amount. It is an integer (such as two) that indicates an interval between pixels between which a difference in pixel values is calculated.

In the field of microscopy, the shift amount in the Brenner gradient is normally set to two. Thus, in Step S15, a contrast value of each of the plurality of pieces of image data obtained in Step S13 may be calculated using the Brenner gradient with the shift amount set to two.

However, when the shift amount in the Brenner gradient is fixed to a specific value and a contrast of an image is evaluated, an area that has an extremely low sensitivity with respect to a contrast of an image may occur in a spatial frequency domain in which an optical system can transmit information. As a result, there is a possibility that the contrast of an image will not be properly evaluated.

For example, when an imaging element in which the pixel size is 0.5 mm and the number of pixels in the x-direction is 1024 pixels is used, a Brenner gradient (evaluation equation) with a shift amount set to two has spatial frequency characteristics represented byline $L_{Brenner}$ of FIG. 7. Further, a line $L_{MTF}$ of FIG. 7 represents an MTF of an optical system. Thus, in this case, contrast information is transmitted by the optical system, but with respect to a component having a spatial frequency of about 1000 [line/mm] on the imaging element, its contrast is given a low evaluation. FIG. 7 illustrates an example of the characteristics of a Brenner gradient with a shift amount set to two, but in a Brenner gradient with another shift amount there also exists a spatial frequency domain that has an extremely low sensitivity with respect to a contrast.

Then, in Step S15, for example, a contrast value of each of the plurality of pieces of image data obtained in Step S13 may be calculated using the following evaluation equation in which a plurality of different shift amounts are used. FIG. 6A illustrates contrast values of the plurality of pieces of image data obtained in Step S13.

$$F_{wide} = \sum_{n} \sum_{y=1}^{H} \sum_{x=1}^{W-n} \{f(x, y) - f(x+n, y)\}^2 \quad (2)$$

For example, when five shift amounts (n=1, 2, 3, 5, and 10) are used, Evaluation Equation (2) has the spatial frequency characteristics represented by a line $L_{wide}$ of FIG. 8. In FIG. 8, in order to easily compare the spatial frequency characteristics of Evaluation Equation (1) with the spatial frequency characteristics of Evaluation Equation (2), the line $L_{wide}$ is drawn by use of a value obtained by dividing each of the contrast values of Evaluation Equation (2) by the number of shift amounts (five) used in Evaluation Equation (2)

As illustrated in FIG. 8, using Evaluation Equation (2), it is possible to evaluate a contrast more stably in a broader spatial frequency domain, compared with the case of conventionally used Evaluation Equation (1). Thus, it is possible to stably evaluate a contrast of an image without being affected by a frequency component included in an image, that is, without being affected by a sample or a magnification of an optical system.

When a plurality of evaluation values are calculated, the microscopy system 1 determines whether they satisfy a prescribed condition (Step S16). The prescribed condition may be whether the number of repetitions of the processes of Step S12 to Step S16 reaches a prescribed number of times, or it may be whether an average interval of the plurality of set values is not greater than a prescribed value.

When the prescribed condition is not satisfied in Step S16, the microscopy system 1 determines a plurality of set values again (Step S17), and then repeats the processes of Step S12 to Step 16.

In Step S17, the arithmetic device 20 determines a plurality of set values so that the following two conditions are satisfied. A first condition is that a distribution range (that is, a search range) and an average interval of the plurality of set values determined in Step S17 are respectively narrower than the distribution range and the average interval of the previous plurality of set values. A second condition is that a set value of the correction collar 111 that corresponds to a maximum evaluation value from among the evaluation values calculated in Step S15 is included in the distribution range of the plurality of set values determined in Step S17. The set value that corresponds to an evaluation value is herein referred to as a set value of a correction device with respect to an evaluation value calculated from certain image data, which is set when the certain image data is obtained. Further, the evaluation value that corresponds to a set value is referred to as an evaluation value with respect to a set value of the correction device that is set when certain image data is obtained, which is calculated from the certain image data.

Accordingly, the microscope apparatus repeatedly performs processing of obtaining a plurality of pieces of image data in a plurality of states in which different set values are set such that the distribution range and the average interval of a plurality of set values of the correction collar 111 that are set in a plurality of states are made narrower every time the processing is repeated, and such that a set value of the correction collar 111 that corresponds to a maximum evaluation value from among the evaluation values calculated by the arithmetic device 20 is included in the distribution range. Then, the arithmetic device calculates a plurality of evaluation values from a plurality of pieces of image data every time the processing is repeated.

FIG. 6B illustrates contrast values of a plurality of pieces of image data, the contrast values being obtained on the basis of the plurality of set values determined in Step S17. In a comparison of FIG. 6B with FIG. 6A, it is confirmed that the plurality of set values (correction collar positions) of FIG. 6B satisfy the above two conditions. Both of FIGS. 6A and 6B illustrate an example in which eleven set values (correction collar positions) are determined, but the number of set values is not limited to the same number, but it may be increased or decreased as long as the average interval of a set value is made narrower every time the processing is repeated.

When the prescribed condition is satisfied in Step S16, the microscopy system 1 calculates a target value on the basis of the plurality of evaluation values calculated in Step S15 and a plurality of set values that correspond to the plurality of evaluation values (Step S18), and terminates the target-value calculating processing. In this case, for example, a set value of the correction collar 111 that corresponds to a maximum evaluation value from among the plurality of evaluation values calculated in Step S15 during the last repetition may be calculated as a target value. Further, a set value of the correction collar 111 that corresponds to a maximum evaluation value from among the plurality of evaluation values calculated in Step S15, but not limited to those during the last repetition, may be calculated as a target value. The arithmetic device 20 stores a combination of a calculated target value and a position of an observation target plane in the storage 25.

When the target value is calculated, the microscopy system 1 changes the set value of the correction collar 111 to the target value (Step S4). In this case, the correction collar manipulating device 14 changes the set value of the correction collar 111 to the target value calculated in Step S3. The correction collar manipulating device 14 may automatically, that is, according to an instruction issued by the arithmetic device 20, change the set value of the correction collar 111 to the target value calculated in Step S3. Further, the correction collar manipulating device 14 may manually change the set value of the correction collar 111 to the target value calculated in Step S3, that is, the correction collar manipulating device 14 may change the set value of the correction collar 111 to the target value calculated in Step S3, by displaying the calculated target value on the display device 30 and by a user manipulating the correction collar manipulating device 50 on the basis of the displayed target value. Further, the user may directly manipulate the correction collar 111 so as to change the set value of the correction collar 111 to the target value.

Further, the microscopy system 1 sets the output of the laser 101 (Step S5). In this case, on the basis of image data obtained in the microscope apparatus when the set value of the correction collar 111 is a target value, the light source controller 11 controls a power of a laser beam that is irradiated onto the sample S. For example, image data may be obtained again after the set value of the correction collar 111 is changed in Step S4, and the output of the laser 101 may be set on the basis of the brightness of an image that is calculated from the image data. Further, when image data in which the set value of the correction collar 111 is a target value in Step S3 has been already obtained, the output of the laser 101 may be set or the sensitivity (gain) of the photodetector 107 may be adjusted on the basis of the brightness of an image that is calculated from the image data.

When the setting of the output of the laser 101 has been completed, the microscopy system 1 captures a Z-stacked image (Step S6). In this case, the microscope apparatus captures a Z-stacked image of the sample S in a state in which a spherical aberration has been corrected, so as to obtain image data. After that, the microscopy system 1 determines whether all of the Z-stacked images have been captured (Step S7). In this case, the arithmetic device 20 determines whether Z-stacked images have been captured at the plurality of image-capturing positions determined in Step S1.

When all of the Z-stacked images have been captured, the microscopy system 1 terminates the Z-stack image-capturing processing. When not all of the Z-stacked images have been captured, the microscopy system 1 changes the position of an observation target plane to a next image-capturing position (Step S8). In this case, according to an instruction issued by the arithmetic device 20, the Z controller 13 moves the Z driving unit 109 in the optical-axis direction, and changes the position of an observation target plane to an image-capturing position at which a Z-stacked image has still not been captured, the image-capturing position being included in the plurality of image-capturing positions determined in Step S1. After that, the microscopy system 1 performs the processes of Step S3 to Step S7 again. The repetition of this processing permits the microscopy system 1 to capture all of the Z-stacked images.

As described above, the microscopy system 1 determines a target set value using a contrast value calculated from image data and an amount of spherical aberration estimated on the basis of information on a medium placed between the objective and an observation target plane. This makes it possible to determine, in a short time, the setting which provides a good correction for a spherical aberration. Specifically, in the microscopy system 1, the microscope apparatus obtains a plurality of pieces of image data in a plurality of states in which different set values are set in the correction collar 111, and the arithmetic device 20 calculates a target set value of the correction collar 111 from a plurality of contrast values calculated from the plurality of pieces of image data. At this point, the arithmetic device 20 estimates, in advance, an amount of spherical aberration that occurs in the microscope apparatus, and determines, on the basis of the estimated amount of spherical aberration, the plurality of states in which different set values are set in the correction collar 111. This permits narrowing of a search range of a set value of the correction collar 111 to some extent from the beginning, as illustrated in FIG. 6A. Accordingly, it is possible to reduce the number of times that image data is obtained, which results in determining a target set value in a short time.

Further, the microscopy system 1 can capture a Z-stacked image while satisfactorily correcting for a spherical aberration in a short time, the spherical aberration varying according to the depth of an observation target plane. This permits the microscopy system 1 to fully utilize an optical performance of the microscope 100 to obtain a high-quality image. Further, in general, in a state in which a spherical aberration has been corrected, an image brighter than that in a state in which a spherical aberration has not been corrected is obtained. Thus, if the output of the laser 101 is set on the basis of the image data obtained in a state in which a spherical aberration has been corrected, it is possible to suppress the output of the laser 101 and to prevent damage to a biological sample. This effect is particularly significant when a deep portion of the sample S is observed, in which a larger output is needed.

Further, when a contrast value is calculated using a plurality of shift amounts, the microscopy system 1 stably evaluates a contrast of an image without being affected by a sample or a magnification of an optical system. Thus, it is possible to evaluate a contrast of an image properly to calculate a target value.

For Step S15 of FIG. 5, the example in which five shift amounts are used has been described, but it is sufficient if a plurality of shift amounts are used in order to stably evaluate a contrast, and the number of shift amounts is not limited to five. Further, the example in which an evaluation value is calculated for each piece of image data has been described, but a whole region of image data may be divided into a plurality of regions so as to calculate an evaluation value for each of the regions obtained by the division (hereinafter referred to as a region evaluation value in order to distinguish it from an evaluation value calculated for each piece of image data). In this case, in Step S18, a target value is calculated for each region (hereinafter referred to as a region target value in order to distinguish it from a target value calculated with respect to the whole region), and a target value with respect to the whole region is calculated on the basis of a plurality of region target values.

Figure 9:
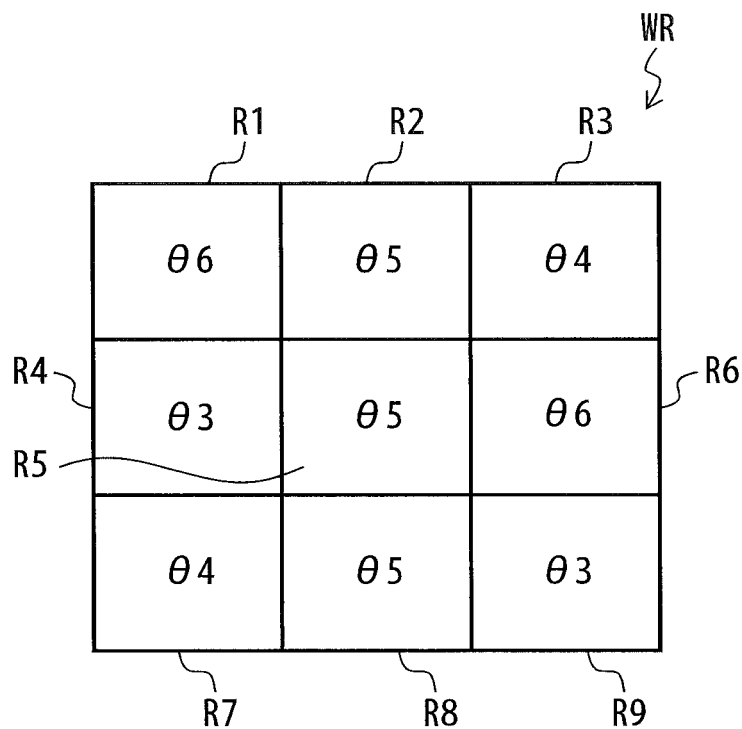
FIG. 9 illustrates an example in which a region target value is calculated for each region of image data.

FIG. 9 illustrates an example in which a whole region WR of image data is divided into nine regions from a region R1 to a region R9 and a region target value is calculated for each region. For example, from among the region target values arranged in ascending order or in descending order ($\theta 3:\theta 3: \theta 4:\theta 4:\theta 5:\theta 5:\theta 5:\theta 6:\theta 6$), an intermediate value ($\theta 5$) or a mode value ($\theta 5$) may be determined to be a target value with respect to the whole region. The number of divisions is not limited to nine, and it may be less than or greater than nine.

A region target value is calculated for each region, and a probable target value is calculated by performing statistical processing on a plurality of region target values. Accordingly, even when image data includes pixel data having a brightness that is extremely higher or lower than other pieces of pixel data, a contrast of an image can be evaluated while suppressing the effect of the pixel data. Thus, it is possible to correctly calculate a set value with which a spherical aberration is corrected.

For Step S15 of FIG. 5 (evaluation-value calculating processing), the example in which a single contrast value is calculated using a plurality of shift amounts for each piece of image data obtained in Step S13 has been described. However, in Step S15, a plurality of contrast values may be calculated for each piece of image data using different shift amounts. In this case, in Step S18, on the basis of a plurality of evaluation values calculated using the same shift amount and a plurality of set values corresponding to the plurality of evaluation values, a tentative target value at that shift amount (hereinafter referred to as a tentative target value) may be calculated. Further, in Step S18, a final single target value may be calculated from a plurality of tentative target values each of which is a tentative target value when a different shift amount is used. The processing of calculating a final target value from a plurality of tentative target values may be, for example, processing of selecting a most probable value from among a plurality of tentative target values (such as processing of selecting a median). It may be processing of calculating a probable value from among the plurality of tentative target values (such as processing of calculating an average). In other words, in order to evaluate a contrast stably, it is sufficient if a plurality of contrast values are calculated from the plurality of pieces of image data in Step S15 using a plurality of shift amounts. Thus, the number of calculated contrasts does not need to be identical to the number of pieces of image data.

Figure 10:
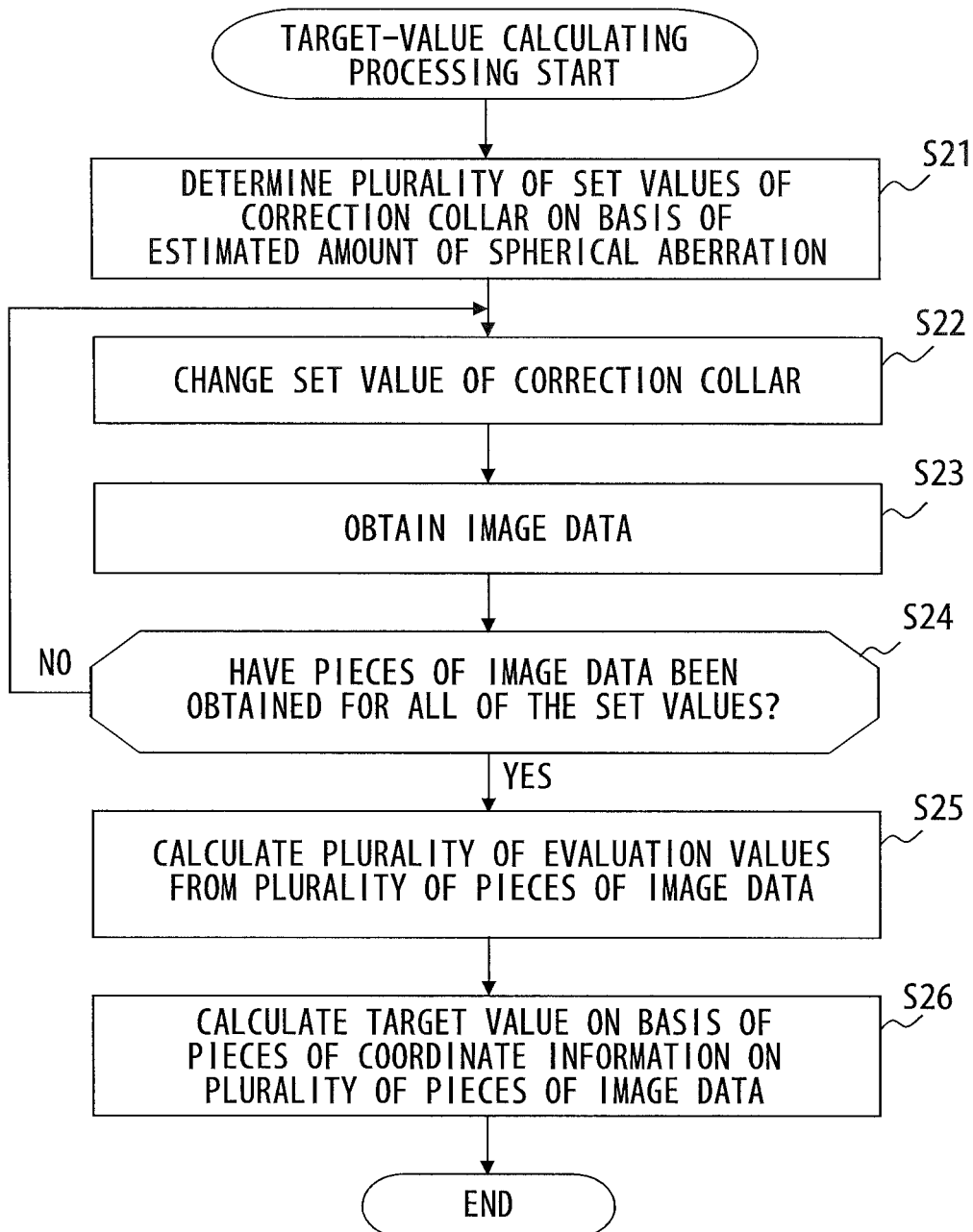
FIG. 10 is a flowchart of another target-value calculating processing.

FIG. 10 is a flowchart of another target-value calculating processing performed in the microscopy system 1. FIG. 11 is a diagram for explaining the target-value calculating processing of FIG. 10. The target-value calculating processing of FIG. 10 is described with reference to FIGS. 10 and 11. The processes of Step S21 to Step S25 of the target-value calculating processing of FIG. 10 are similar to those of Step S11 to Step S15 of the target-value calculating processing of FIG. 5, so detailed descriptions will be omitted.

When a plurality of evaluation values are calculated in Step S25, the microscopy system 1 calculates a target value on the basis of pieces of coordinate information on a plurality of pieces of image data (Step S26), and terminates the target-value calculating processing. The coordinate information on image data is a combination of an evaluation value calculated from the image data and a set value of the correction collar 111 that corresponds to the evaluation value.

In Step S26, first, the arithmetic device 20 selects three or more pieces of image data from among the plurality of pieces of image data obtained in Step S23. The three or more pieces of image data are selected such that image data from which a maximum evaluation value from among the plurality of evaluation values calculated in Step S25 has been calculated is included.

After that, the arithmetic device 20 calculates a target value on the basis of pieces of coordinate information on the selected three or more pieces of image data. Specifically, a function is calculated by performing interpolation or function approximation on the basis of the pieces of coordinate information on the three or more pieces of image data. This function is related to an evaluation value and a set value. Then, a set value obtained from a peak coordinate of the calculated function (a coordinate in which the evaluation value reaches a maximum value) is calculated as a target value. The arithmetic device 20 stores, in the storage 25, a combination of a calculated target value and a position of an observation target plane.

FIG. 11 illustrates an example in which three pieces of image data constituted of the image data from which a maximum evaluation value is calculated and pieces of image data before and after that image data (that is, pieces of image data each having a set value close to the set value of that image data) are selected, a quadratic function is calculated by Lagrange interpolation using three pieces of coordinate information obtained from these pieces of image data, and a target value is calculated from the peak coordinate of the quadratic function. Any interpolation method such as Lagrange interpolation or spline interpolation may be used to perform interpolation. Further, any approximation method such as a least-square method may be used to perform function approximation.

Even when the target-value calculating processing of FIG. 10 is performed instead of the target-value calculating processing of FIG. 5, the microscopy system 1 can obtain a similar effect. Further, when the target-value calculating processing of FIG. 10 is performed, a target value can be calculated with a high degree of accuracy with a much smaller number of times of obtaining the image data than the number of times that image data is obtained when the target-value calculating processing of FIG. 5 is performed. Thus, the microscopy system 1 can satisfactorily correct for a spherical aberration in a shorter time.

A target value may be calculated by combining the target-value calculating processing of FIG. 5 and the target-value calculating processing of FIG. 10. For example, the processes of Step S16 and Step S17 of FIG. 5 may be added to the target-value calculating processing of FIG. 10, and a target value may be repeatedly calculated while gradually narrowing a distribution range (that is, a search range) and an average interval of a plurality of set values such that the target value calculated in Step S26 is included in the distribution range. This makes it possible to calculate a target value with a higher degree of accuracy.

Figure 14A:
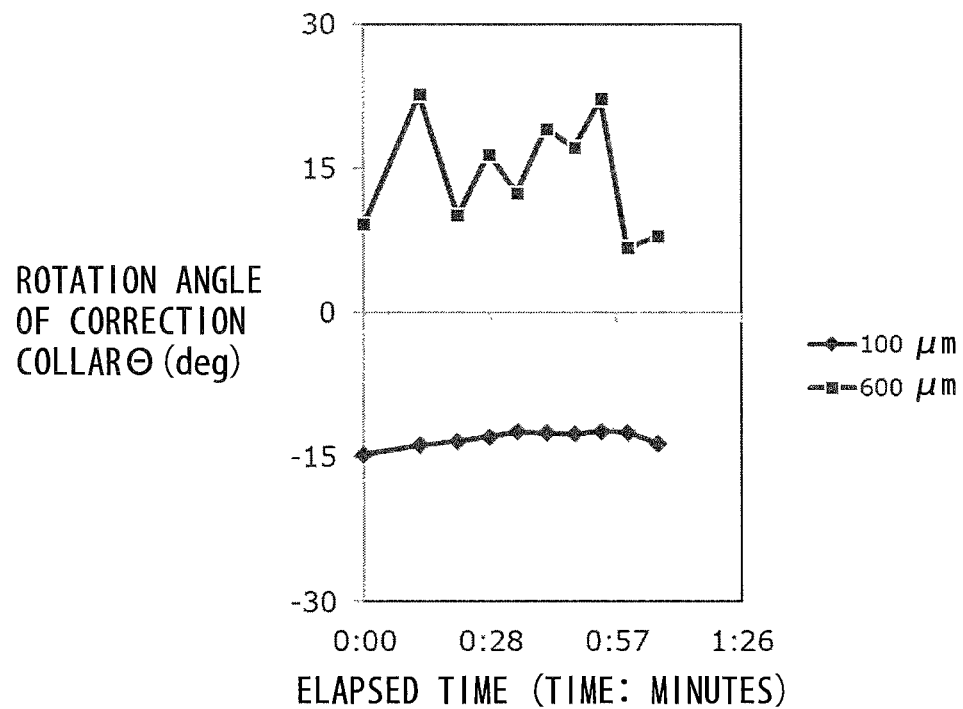
FIG. 14A illustrates how a target value changes when the target value is calculated multiple times.
Figure 14B:
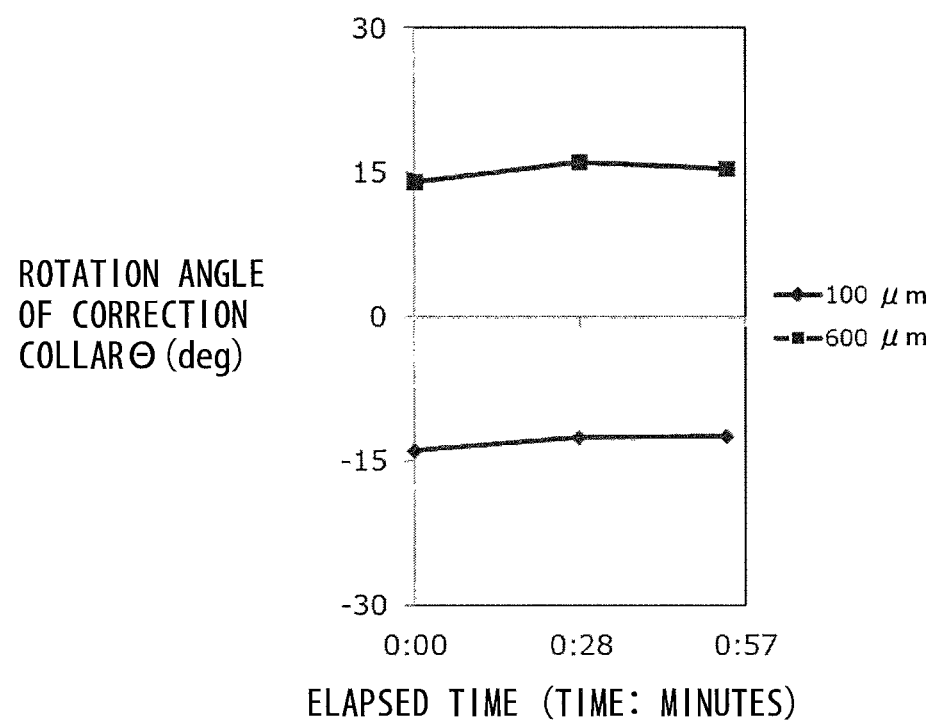
FIG. 14B illustrates how a second target value changes when the second target value is calculated multiple times.

FIG. 12 is a flowchart of yet another target-value calculating processing performed in the microscopy system 1. FIG. 13 is a diagram for explaining a relationship between the reliability of a target value and an evaluation value. FIG. 14A illustrates how a target value changes when the target value is calculated multiple times. FIG. 14B illustrates how a second target value changes when the second target value is calculated multiple times. The target-value calculating processing of FIG. 12 is described with reference to FIGS. 12 to 14B. The processes of Step S31 to Step S36 of the target-value calculating processing of FIG. 12 are similar to those of Step S21 to Step S26 of the target-value calculating processing of FIG. 10, so detailed descriptions will be omitted.

When the target value is calculated in Step S36, the microscopy system 1 determines whether the reliability of the target value has been determined to be high or low (Step S37). When the high/low of the reliability has not been determined, the microscopy system 1 determines whether the reliability of the target value is high or low (Step S38).

In FIG. 13, a plurality of contrast values calculated from a plurality of pieces of image data obtained when the depth of an observation target plane is 100 μm (measured values), and a plurality of contrast values calculated from a plurality of pieces of image data obtained when the depth of an observation target plane is 600 μm (measured values) are plotted. As illustrated in FIG. 13, in general, if the position of an observation target plane is deeper, a contrast of an image in a state in which a spherical aberration has been corrected is lower and a change in contrast due to the change in a set value of a correction collar is also smaller. Thus, it is difficult to correctly determine the state in which a spherical aberration has been corrected, which results in decreasing the reliability of a target value.

Thus, in Step S38, on the basis of the plurality of contrast values calculated in Step S35, the arithmetic device 20 determines whether the reliability of the target value calculated in Step S36 is high or low (Step S39). Specifically, for example, the arithmetic device 20 may determine that the reliability is high when a contrast value that is maximal from among the plurality of contrast values is not less than a prescribed threshold, and may determine that the reliability is low when the contrast value is less than the prescribed threshold. Further, the arithmetic device 20 may determine, on the basis of the depth of an observation target plane, whether the reliability of a target value is high or low.

When it is determined in Step S39 that the reliability is high, the microscopy system 1 terminates the target-value calculating processing. On the other hand, when it is determined in Step S39 that the reliability is low, the microscopy system 1 obtains a plurality of pieces of image data again and calculates a target value again on the basis of these pieces of image data (Step S31 to Step S36). Accordingly, in the microscopy system 1, a plurality of pieces of image data are obtained by the microscope apparatus multiple times, and a target value is calculated by the arithmetic device 20 multiple times.

When it determines in Step S37 that the high/low of the reliability has been determined, the microscopy system 1 determines whether a target value has been calculated not less than a prescribed number of times (Step S40). In this case, for example, the arithmetic device 20 determines whether the target value has been calculated not less than a predetermined number of times (for example, three). When it is determined that the number of times that a target value has been calculated has not reached the predetermined number of times, the microscopy system 1 obtains a plurality of pieces of image data again and calculates a target value again on the basis of these pieces of image data (Step S31 to Step S36).

When it determines in Step S40 that the target value has been calculated not less than a prescribed number of times, the microscopy system 1 calculates a second target value on the basis of a plurality of target values (Step S41) and terminates the target-value calculating processing. In this case, the arithmetic device 20 calculates the second target value on the basis of the plurality of target values calculated in Step S36. The processing of calculating a second target value may be, for example, processing of selecting a most probable value from among a plurality of target values (such as processing of selecting a median). Further, the processing of calculating a second target value may be processing of calculating a probable value from among the plurality of target values (such as processing of calculating an average).

In FIG. 14A, a plurality of target values calculated when the depth of an observation target plane is 100 μm and a plurality of target values calculated when the depth of an observation target plane is 600 μm are plotted. In FIG. 14B, second target values each of which is obtained by averaging three target values from among a plurality of target values calculated when the depth of an observation target plane is 100 μm and second target values each of which is obtained by averaging three target values from among a plurality of target values calculated when the depth of an observation target plane is 600 μm are plotted. As illustrated in FIG. 14A, in a deep portion of a sample, in which a contrast of an image is lower (here, a portion at a depth of 600 μm), a target value varies relatively greatly every time it is calculated. However, as illustrated in FIG. 14B, a second target value calculated by averaging processing has a smaller range of variation that occurs every time it is calculated, and indicates a substantially constant value without being affected by the depth of an observation target plane. In other words, a calculation of a second target value permits an improvement in the reliability of data.

Even when the target-value calculating processing of FIG. 12 is performed instead of the target-value calculating processing of FIG. 5, the microscopy system 1 can obtain a similar effect. Further, if the target-value calculating processing of FIG. 12 is performed, a target value is calculated multiple times when a contrast of an image is low and a target value has a low reliability, so as to calculate a second target value that has a higher reliability. Thus, the microscopy system 1 can satisfactorily correct for a spherical aberration without being affected by the depth of an observation target plane.

FIG. 12 illustrates the example in which it is determined whether the reliability of a target value is high or low so as to determine whether a second target value is to be calculated, but the second target value may be calculated without a determination of whether the reliability of a target value is high or low. Further, the second target value may be calculated by combining the target-value calculating processing of FIG. 5 and the target-value calculating processing of FIG. 12. For example, the processes of Step S37 to Step S41 of FIG. 12 may be added to the target-value calculating processing of FIG. 5.

Further, FIG. 12 illustrates the example in which a second target value is calculated from a plurality of target values so as to improve the reliability of a target value (second target value), but the method for improving the reliability is not limited to this method. A plurality of evaluation values may be obtained for each set value and a second evaluation value may be calculated from the plurality of evaluation values for each set value, so as to calculate, from a plurality of second evaluation values calculated using different set values, a target value that has a high reliability. In this case, the process of Step S36 may be omitted. In Step S41, a second evaluation value may be calculated for each set value by performing processing of selecting, from among a plurality of target values obtained when the same set value is used, a most probable value (such as processing of selecting a median), or processing of calculating, from among the plurality of target values, a probable value (such as processing of calculating an average). Then, a target value may be calculated from a plurality of second evaluation values corresponding to different set values. The processing of calculating a target value from a plurality of second evaluation values may be, for example, processing based on coordinate information, as is the case with Step S36. Also in such a method, a target value is calculated from a plurality of pieces of image data, which permits an improvement in the reliability of the target value.

Figure 15:
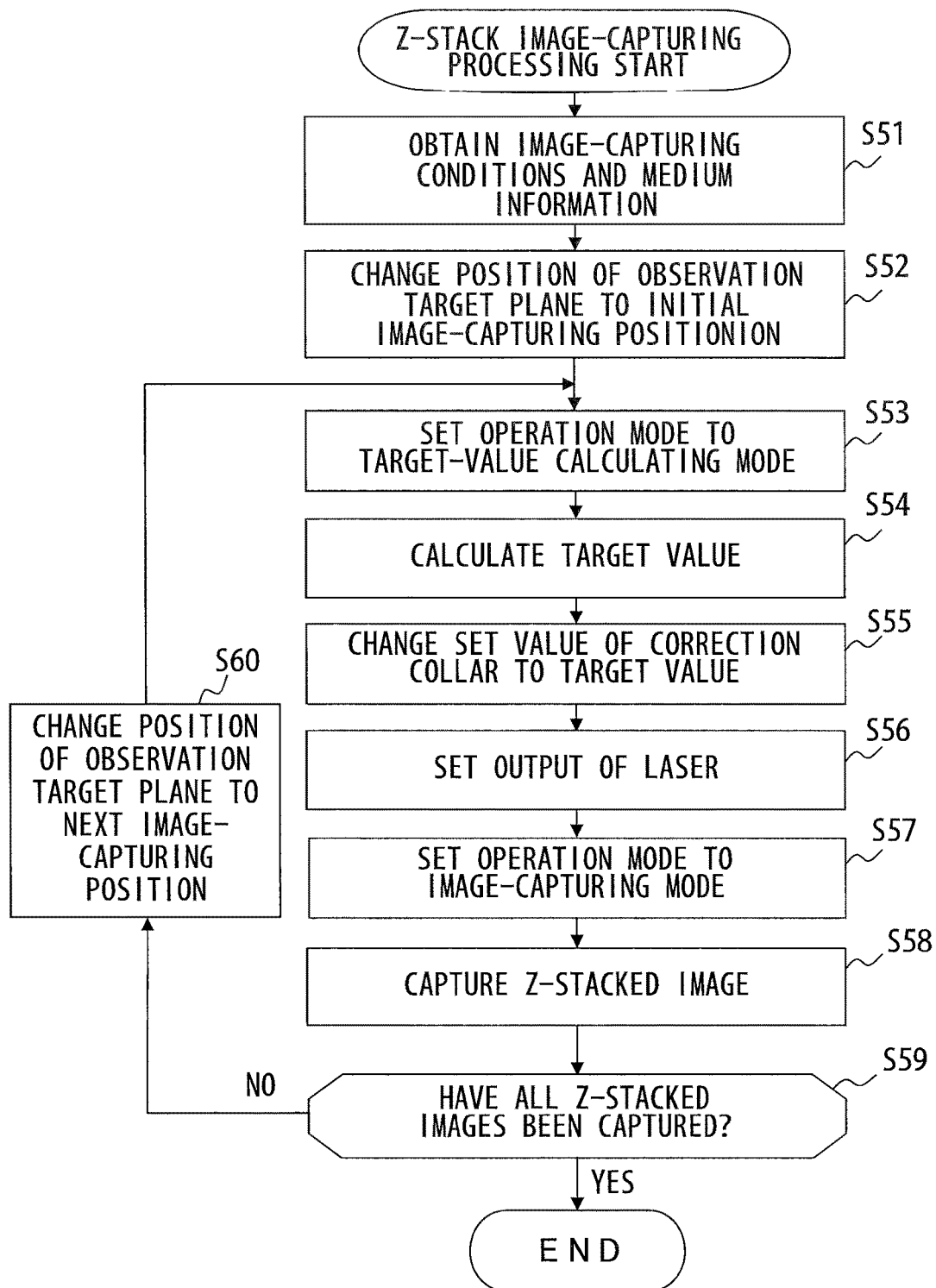
FIG. 15 is a flowchart of another Z-stack image-capturing processing.
Figure 16A:
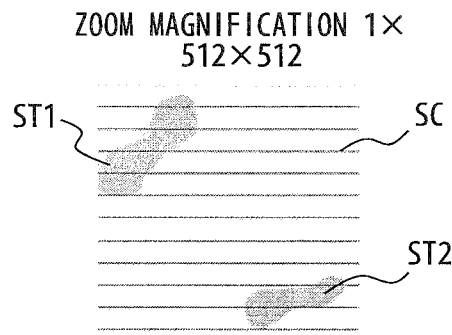
FIG. 16A illustrates an example of a setting of a scanning unit 102 in an image-capturing mode.
Figure 16B:
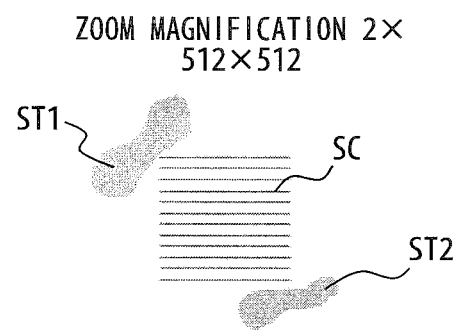
FIG. 16B illustrates an example of a setting in which, compared with the setting of FIG. 16A, magnification is performed in zoom magnification.
Figure 16C:
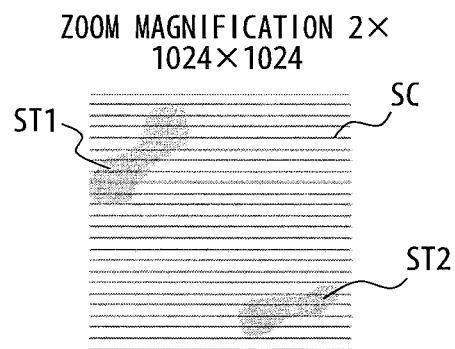
FIG. 16C illustrates an example of a setting in which, compared with the setting of FIG. 16A, the number of samplings is increased while maintaining a field of view.
Figure 16D:
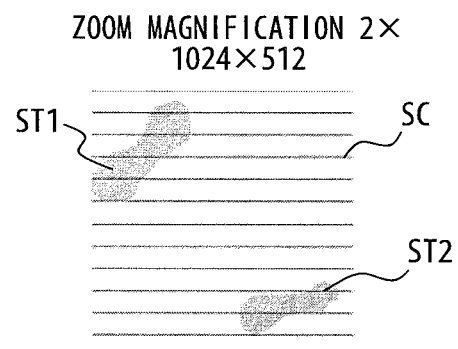
FIG. 16D illustrates an example of a setting of the scanning unit 102 in a contrast calculating mode.
Figure 16E:
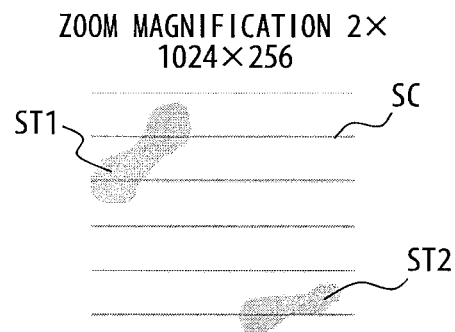
FIG. 16E illustrates another example of a setting of the scanning unit 102 in a contrast calculating mode.

FIG. 15 is a flowchart of another Z-stack image-capturing processing performed in the microscopy system 1. FIGS. 16A to 16E are diagrams for explaining settings of the scanning unit 102. FIG. 16A illustrates an example of a setting of the scanning unit 102 in an image-capturing mode. FIG. 16B illustrates an example of a setting in which, compared with the setting of FIG. 16A, magnification is performed in zoom magnification. FIG. 16C illustrates an example of a setting in which, compared with the setting of FIG. 16A, the number of samplings is increased while maintaining a field of view. FIGS. 16D and 16E illustrate examples of settings of the scanning unit 102 in a contrast calculating mode. The Z-stack image-capturing processing of FIG. 15 is described with reference to FIGS. 15 to 16E. The Z-stack image-capturing processing of FIG. 15 is different from the Z-stack image-capturing processing of FIG. 4 in that processes of changing an operation mode (Step S53 and Step S57) are included. Other processes (Step S51, Step S52, Step S54 to Step S56, and Step S58 to Step S60) are similar to those of Step S1 to Step S8 of the Z-stack image-capturing processing of FIG. 4.

When the position of an observation target plane is changed to an initial image-capturing position, the microscopy system 1 sets the operation mode to a target-value calculating mode (Step S53). In this case, according to an instruction issued by the arithmetic device 20, the zoom controller 12 changes the setting of the scanning unit 102 to a different setting (second setting) than a setting in an image-capturing mode (first setting) that is described later. The setting of the scanning unit 102 in a target-value calculating mode is a setting for making it possible to obtain image data as rapidly as possible while maintaining a pixel resolution that has a value not greater than a given value (that is, a pixel resolving power that has a value greater than or equal to a given value) in order to calculate a contrast value. The setting of the scanning unit 102 in a target-value calculating mode is specifically described below.

When the value of a pixel resolution is too large, the pixel resolution has a value greater than that of the optical resolution, and a pixel size calculated from the pixel resolution is greater than a distance between two pixels that can be optically detected. In this case, a spherical aberration that has occurred is not sufficiently reflected in image data, so it is not possible to evaluate a contrast of an image correctly. Thus, when image data for calculating a contrast value is obtained, the value of a pixel resolution is preferably small and not greater than a given value that permits a proper evaluation of a contrast.

As a method for making the value of a pixel resolution smaller, there is a method for increasing a zoom magnification. For example, when the value of a pixel resolution in the setting of the scanning unit 102 in an image-capturing mode (for example, when an image size is 512×512 and a zoom magnification is 1×) is too large, as illustrated in FIG. 16A, it is possible to make the value of a pixel resolution smaller by increasing the zoom magnification, as illustrated in FIG. 16B. However, a field of view is made narrower if only the zoom magnification is increased, and the probability of there being no structures in the sample S (a structure ST1 and a structure ST2) in the field of view will be higher. When there does not exist any structure (a structure that emits fluorescence when fluorescence is observed) in the field of view, a sufficient contrast does not occur, which is not suitable for calculating a contrast value. Further, in a method for increasing a zoom magnification while maintaining a field of view, as illustrated in FIG. 16C, an image size (1024×1024) is made larger, so it takes a long time to obtain image data.

As represented by Equation (1) and Equation (2) described above, the contrast value is calculated on the basis of a difference in pixel values between pixels that are arranged unidirectionally. In order to make a temporal difference between pixels that is to be calculated smaller, the contrast value is normally calculated on the basis of a difference in pixel values between pixels that are arranged in a direction along a scanning line SC (an x-direction). Thus, the value of a pixel resolution that is to be made smaller in order to evaluate a contrast value properly is that of a pixel resolution related to an x-direction, and the value of a pixel resolution related to a y-direction does not always have to be as small as that of a pixel resolution related to an x-direction.

Thus, in the microscopy system 1, a setting in which a zoom magnification is increased while maintaining a field of view and the number of scanning lines SC is reduced by leaving out a portion of scanning is determined to be the setting of the scanning unit 102 in a target-value calculating mode, as illustrated in FIGS. 16D and 16E. FIGS. 16D and 16E respectively illustrate a setting in which the number of scanning lines in the setting of FIG. 16C is reduced to ½ and a setting in which the number of scanning lines in the setting of FIG. 16C is reduced to ¼. When the spacing between scanning lines is too large, there is a possibility that a structure will not be situated on a scanning line even though it exists in a field of view. Thus, the number of scanning lines is preferably determined on the basis of the sample S of image data, a magnification of the objective 110, and a zoom magnification of a scanner. This permits a proper evaluation of a contrast while reducing the time to obtain image data.

An example in which the value of a pixel resolution in an image-capturing mode is large has been described above, but when the value of a pixel resolution in an image-capturing mode is sufficiently small, only the setting of the number of scanning lines may be different between the setting of a contrast calculating mode and the setting of an image-capturing mode. Further, an example in which a field of view is maintained constant in an image-capturing mode and a contrast calculating mode has been described, but the field of view in a contrast calculating mode may be wider than that in an image-capturing mode.

The microscopy system 1 calculates a target value in a target-value calculating mode (Step S54). Specifically, the microscopy system 1 obtains image data for calculating a contrast so as to calculate a target value. After that, when the settings of the correction collar 111 and the laser 101 are changed (Step S55, Step S56), the microscopy system 1 changes the operation mode to an image-capturing mode (Step S57). In this case, according to an instruction issued by the arithmetic device 20, the zoom controller 12 changes the setting of the scanning unit 102 to a different setting (first setting) than a setting in a target-value calculation mode (second setting). The setting of the scanning unit 102 in an image-capturing mode is a setting suitable for obtaining image data for observation.

After that, the microscopy system 1 captures a Z-stacked image in an image-capturing mode (Step S58), and repeats the processes of Step S53 to Step S60 until the capturing of all of the Z-stacked images is completed.

Even when the Z-stack image-capturing processing of FIG. 15 is performed instead of the Z-stack image-capturing processing of FIG. 4, the microscopy system 1 can obtain a similar effect. Further, if the Z-stack image-capturing processing of FIG. 15 is performed, it becomes possible to properly evaluate a contrast of an image in a short time. This permits a determination of a setting that makes it possible to satisfactorily correct for a spherical aberration in a shorter time. Thus, the microscopy system 1 can satisfactorily correct for a spherical aberration in a shorter time.

FIG. 17 is a flowchart of yet another Z-stack image-capturing processing performed in the microscopy system 1. FIG. 18 illustrates an example of an estimation function. FIG. 19 illustrates an example of a correction function. The Z-stack image-capturing processing of FIG. 17 is described with reference to FIGS. 17 to 19.

First, the microscopy system 1 obtains image-capturing conditions and medium information (Step S61), changes the position of an observation target plane to an initial image-capturing position (Step S62), and calculates a target value (Step S63). The processes of Step S61 to Step S63 are similar to those of Step S1 to Step S3 of FIG. 4.

When the target value in the initial image-capturing position is calculated, the microscopy system 1 calculates a correction function (Step S64). First, from the medium information obtained in Step S61, the arithmetic device 20 estimates, for each depth of an observation target plane, an amount of spherical aberration that occurs in the microscope apparatus. After that, on the basis of an estimation function corresponding to an estimated amount of spherical aberration for each depth of an observation target plane and on the basis of the target value calculated in Step S63, the arithmetic device 20 calculates a correction function that represents a target value for each depth of an observation target plane. Specifically, on the basis of the correction collar information stored in the storage 25, the arithmetic device 20 calculates an estimation function F1 that represents an estimation set value for each depth of an observation target plane. After that, the arithmetic device 20 modifies the estimation function F1 on the basis of a target value P1 calculated in Step S63, so as to calculate a correction function F2 illustrated in FIG. 19. FIG. 18 illustrates an estimation function when a sample has a two-layered structure in which layers have different refractive indexes. Further, FIG. 19 illustrates a correction function F2 obtained by moving the estimation function F1 in parallel such that the correction function F2 passes through the target value P1.

When the correction function is calculated, the microscopy system 1 changes the settings of the correction collar 111 and the laser 101 (Step S65, Step S66), and captures a Z-stacked image (Step S67). After the image-capturing is completed, the microscopy system 1 determines whether all of the Z-stacked images have been captured (Step S68), and changes the position of an observation target plane to a next image-capturing position when not all of the Z-stacked images have been captured (Step S69). The processes of Step S65 to Step S69 are similar to those of Step S4 to Step S8 of FIG. 4.

When it changes the position of an observation target plane, the microscopy system 1 calculates a target value on the basis of the correction function (Step S70). In this case, on the basis of the correction function calculated in Step S64 and the depth of a current observation target plane, the arithmetic device 20 calculates a target value with respect to the current observation target plane. After that, the microscopy system 1 repeats the processes of Step S65 to Step S70 until the capturing of all of the Z-stacked images is completed, and terminates the Z-stack image-capturing processing.

Even when the Z-stack image-capturing processing of FIG. 17 is performed instead of the Z-stack image-capturing processing of FIG. 4, the microscopy system 1 can obtain a similar effect. Further, if the Z-stack image-capturing processing of FIG. 17 is performed, it is possible to reduce, using a correction function, the number of times that an image is obtained in the processing of calculating a target value. Thus, it becomes possible to determine a setting that makes it possible to satisfactorily correct for a spherical aberration in a much shorter time. Furthermore, when the observation target plane is situated at a position in which a structure that causes a contrast does not exist, there is a possibility that a contrast of an image will not be evaluated properly, so it is difficult to calculate a target value from image data. However, if a target value is calculated by use of a correction function, it is possible to correct for a spherical aberration with more certainty.

Figure 20:
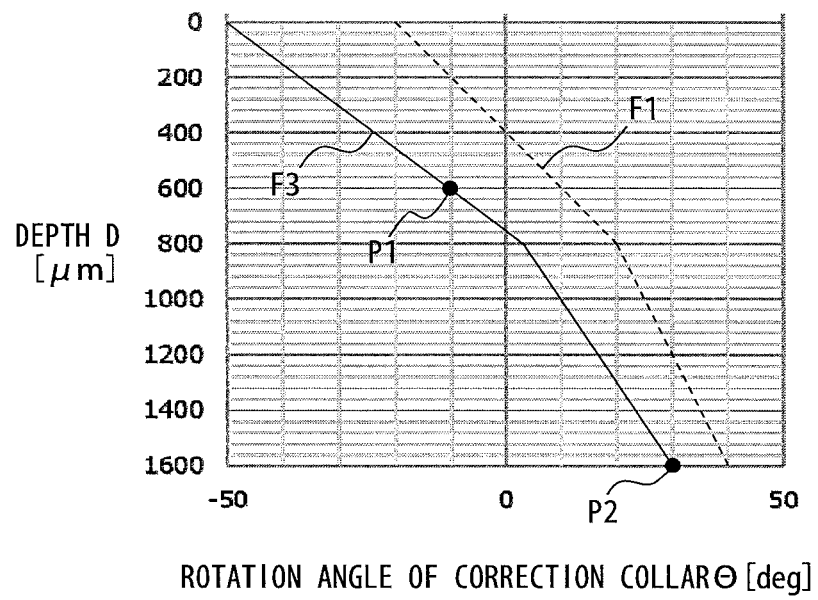
FIG. 20 illustrates another example of a correction function.

FIG. 17 illustrates an example in which only a target value in an initial image-capturing position is calculated from image data, but a target value at an arbitrary depth position from among a plurality of depth positions may also be calculated from image data. A more accurate correction function can be obtained by increasing a measured depth. For example, as illustrated in FIG. 20, the target value P1 and a target value P2 may respectively be calculated from image data at a depth of 600 μm and at a depth of 1600 μm, and the estimation function F1 may be modified on the basis of the target value P1 and the target value P2, so as to calculate a correction function F3. FIG. 20 illustrates the correction function F3 obtained by enlarging the estimation function F1 laterally (in an axial direction of a rotation angle) such that the correction function F3 passes through the target value P1 and the target value P2. Further, the correction function may be calculated by any approximation method, such as a least-square method using the target value P1 and the target value P2.

FIG. 17 illustrates an example in which a target value at a depth other than a measured depth is calculated on the basis of a correction function, but the correction function does not have to be calculated. Instead of calculation based on the correction function, a target value at a depth other than a measured depth may be calculated, in each case, on the basis of a known target at a measured depth and an estimated amount of spherical aberration.

Figure 21:
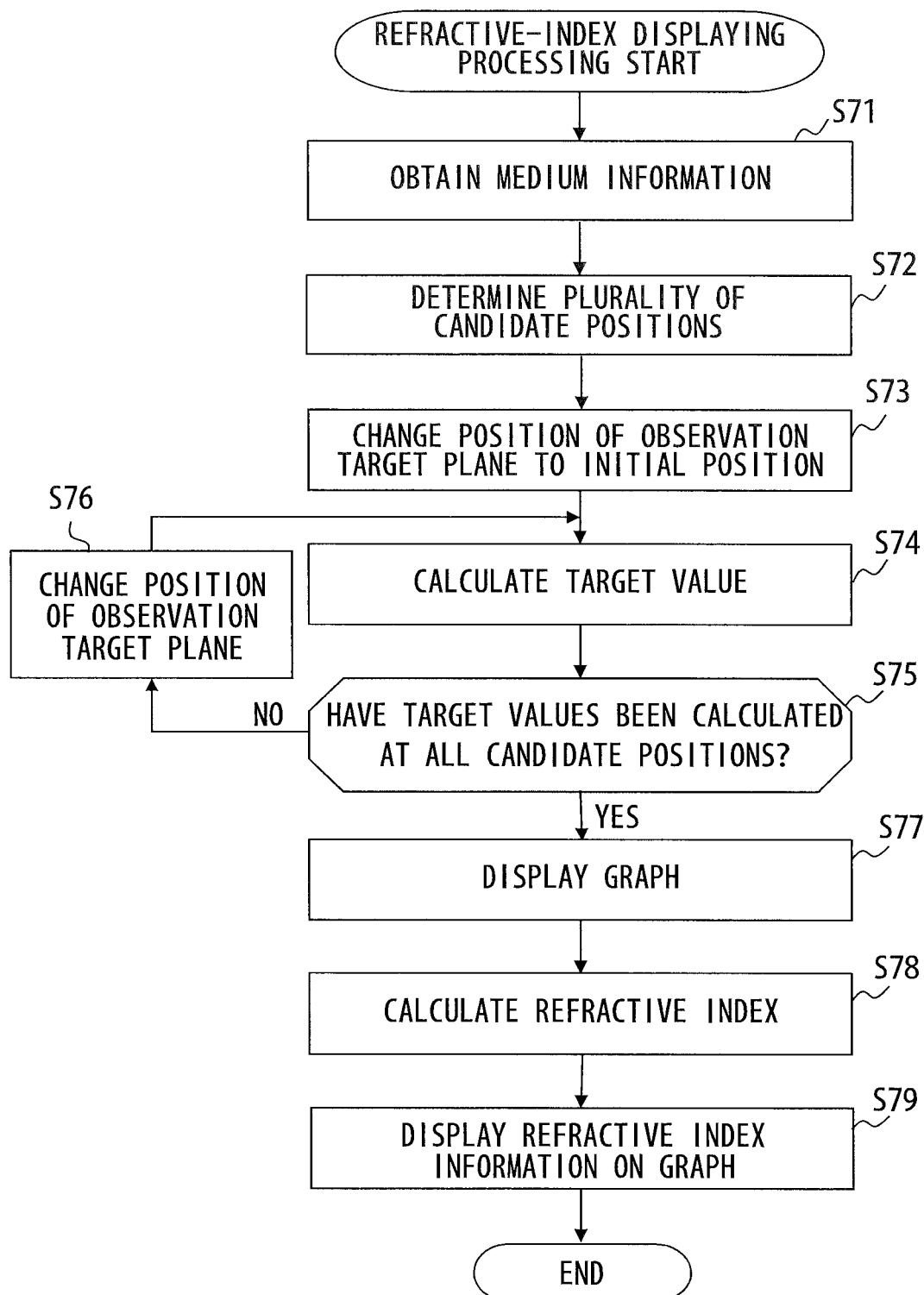
FIG. 21 is a flowchart of refractive-index displaying processing.
Figure 22:
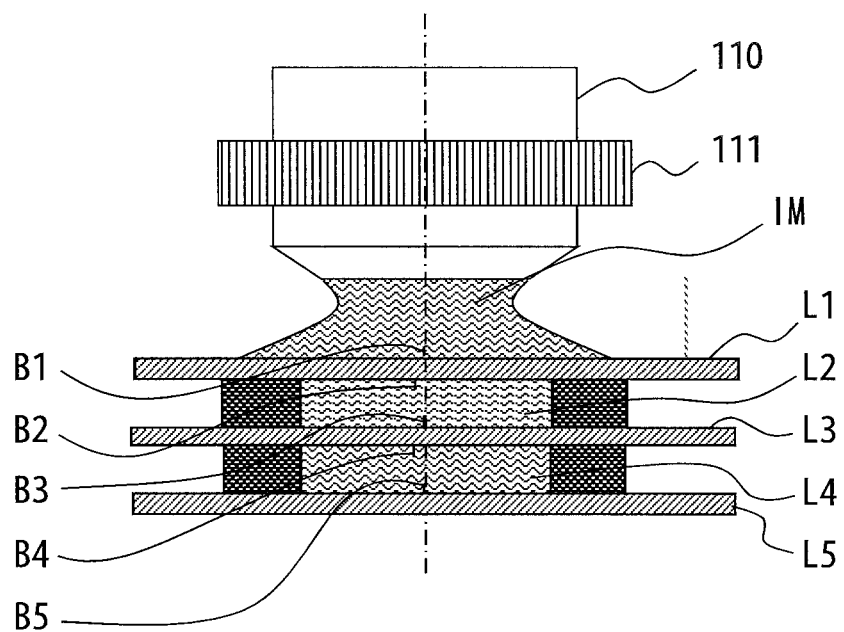
FIG. 22 illustrates an example of a structure of a sample S.
Figure 24:
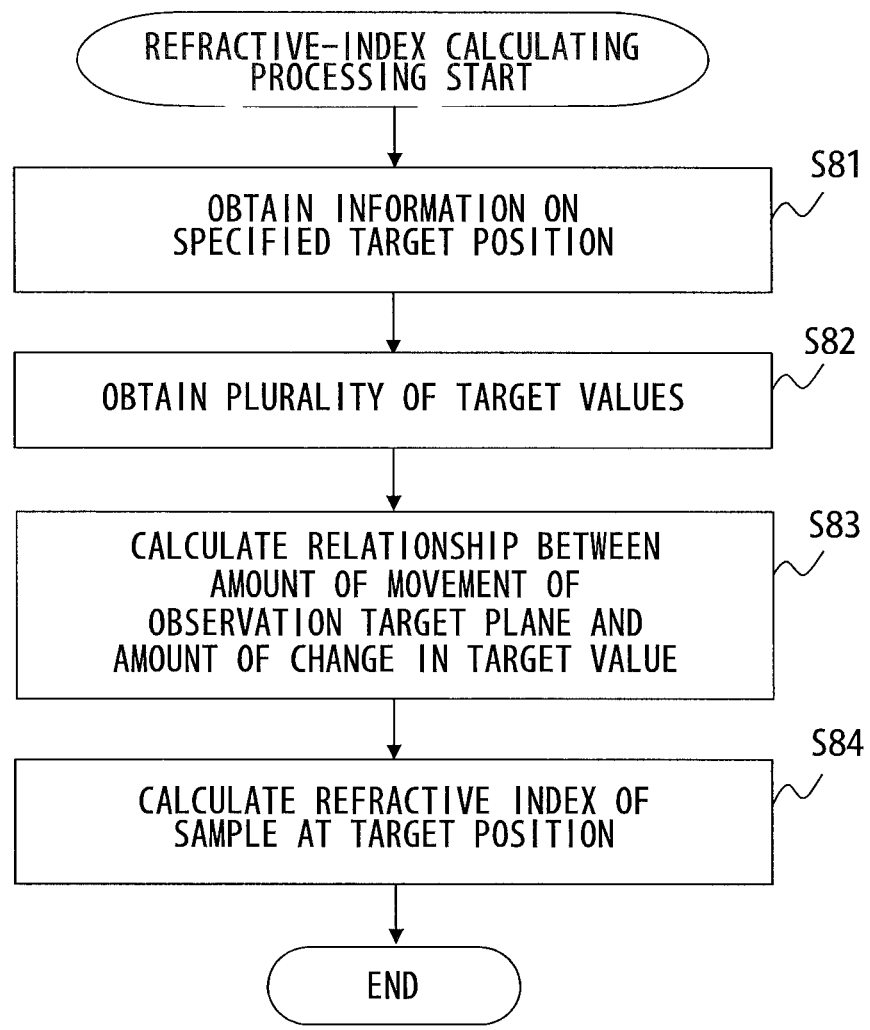
FIG. 24 is a flowchart of refractive-index calculating processing.

FIG. 21 is a flowchart of the refractive-index displaying processing performed in the microscopy system 1. FIG. 22 illustrates an example of a structure of the sample S. FIG. 23 illustrates an example of a graph displayed on the display device 30. FIG. 24 is a flowchart of refractive-index calculating processing performed in the microscopy system 1. FIG. 25 illustrates a relationship between a change rate and a refractive index. FIGS. 26A and 26B are graphs on which pieces of refractive index information at different target positions are displayed. FIG. 27 is a graph on which refractive index information that indicates a refractive index distribution of the sample S is displayed. The refractive-index displaying processing of FIG. 21 is described below with reference to FIGS. 21 to 27.

An example in which, as illustrated in FIG. 22, the sample S is a laminated structure that is constituted of a plurality of layers having different refractive indexes (a layer L1 to a layer L5) is described below. FIG. 22 illustrates a structure constituted of five layers. The layer L1, the layer L3, and the layer L5 are glass plates each having a refractive index of 1.52, the layer L2 is silicone having a refractive index of 1.4, and the layer L4 is water having a refractive index of 1.33. Further, on both of the upper and lower surfaces of the layer L1 and the layer L3, and on the upper surface of the layer L5, a bead B1 to a bead B5 that emit fluorescence when they are irradiated with a laser beam are placed. Furthermore, an immersion liquid IM is filled in between the objective 110 and the sample S. The immersion liquid IM is water having a refractive index of 1.33.

First, the microscopy system 1 obtains medium information (Step S71). In this case, as is the case with Step S1 of FIG. 4, a user inputs medium information such as a refractive index of the sample S, a refractive index and a thickness of a cover class, and a refractive index of the immersion liquid, and the arithmetic device 20 obtains these pieces of information. The refractive indexes that are input here are used for the purpose of reducing the number of times that image data is obtained, so they may be approximate values. Accurate refractive indexes are calculated in Step S78, which will be described later.

Next, the microscopy system 1 determines a plurality of candidate positions that are candidates for a position of an observation target plane (Step S72). In this case, on the basis of information on the depth of an observation target plane that the user input using, for example, the keyboard 40, the arithmetic device 20 determines a plurality of candidate positions at each of which image data is to be obtained. Pieces of information on the determined plurality of candidate positions (a plurality of pieces of depth information) are stored in the storage 25. For example, the user may input a depth range and an interval in which image data is to be obtained, and then the arithmetic device 20 may determine a plurality of candidate positions from the depth range and the interval. In the present embodiment, the arithmetic device 20 determines five candidate positions at each of which there exists a bead.

After that, the microscopy system 1 changes the position of an observation target plane to an initial position (Step S73). In this case, according to an instruction issued by the arithmetic device 20, the Z controller 13 moves the Z driving unit 109 in the optical-axis direction so as to change the position of an observation target plane to the initial position, which is one of the plurality of candidate positions determined in Step S71. In the present embodiment, the position of an observation target plane is changed to the position of the bead B1.

When the position of an observation target plane is changed, the microscopy system 1 calculates a target set value in the observation target plane (Step S74). In this case, the target-value calculating processing of FIG. 5, 10, or 12 described above is performed. The calculated target value is stored in the storage 25, associated with information on a candidate position (such as depth information). The target-value calculating processing is preferably performed in the above-described target-value calculating mode.

When the target value is calculated, the microscopy system 1 determines whether target values have been calculated at all of the plurality of candidate positions determined in Step S72 (Step S75). When target values have not been calculated at all of the candidate positions, the microscopy system 1 changes the position of an observation target plane to a candidate position at which a target value has still not been calculated, the candidate position being included in the plurality of candidate positions determined in Step S72 (Step S76), so as to calculate a target value at the candidate position to which the position of an observation target plane has been changed. (Step S74). The repetition of these processes permits a calculation of a plurality of target values each corresponding to an amount of spherical aberration that occurs in the microscope apparatus when the observation target plane is situated at a different position in the sample S in the optical-axis direction of the objective 110. In the present embodiment, five target values that respectively correspond to amounts of spherical aberration that occur in the microscope apparatus when the observation target plane is situated at the bead B1 to the bead B5 are calculated.

When target values are calculated at all of the candidate positions, the microscopy system 1 displays a graph that indicates a relationship between a position of an observation target plane and a target value (Step S77). In this case, first, the arithmetic device 20 generates the above-described graph on the basis of the plurality of target values calculated in Step S74, and then displays the generated graph on the display device 30. For example, the graph may be generated by plotting, on a space having a vertical axis that represents the position of an observation target plane and a horizontal axis that represents the target value, points that represent the plurality of target values stored in the storage 25, and by interpolating between two adjacent points. Any interpolation method such as linear interpolation, Lagrange interpolation, or spline interpolation may be used to perform interpolation. Further, the graph may be generated by performing function approximation instead of interpolation. In the present embodiment, as illustrated in FIG. 23, a graph G1 on which five points that represent five calculated target values are plotted and linear interpolation is performed between adjacent points is displayed. In FIG. 23, the vertical axis represents a depth D that is a distance from a sample surface (the upper surface of the layer L1) in the optical-axis direction, and the horizontal axis represents a rotation angle θ of the correction collar 111.

When the user specifies a point on the graph G1 displayed on the display device 30 using a pointer P and a target position in the sample S is specified as a result of specifying the point, the microscopy system 1 calculates a refractive index of the sample S at the target position (Step S78). In this case, the arithmetic device 20 calculates the refractive index of the sample S at the target position on the basis of the plurality of target values. Specifically, the arithmetic device 20 performs the processing of FIG. 24.

First, the arithmetic device 20 obtains information on the specified target position (Step S81). For example, the arithmetic device 20 obtains depth information on the target position. Next, the arithmetic device 20 obtains a plurality of target values (Step S82). For example, the arithmetic device 20 specifies, from among the plurality of points plotted on the graph, two points that are situated close to the specified point, and obtains target values for those two points. At this point, pieces of depth information are also obtained along with the target values. The plurality of target values obtained in Step S82 are not limited to the target value calculated in Step S74. The plurality of target values and the plurality of pieces of depth information may be obtained by moving the observation target plane to a plurality of positions in the vicinity of the depth of the target position and by calculating a target value at each of the plurality of positions.

After that, the arithmetic device 20 calculates, on the basis of the plurality of target values, a relationship, at the target position, between an amount of movement of the observation target plane in the optical-axis direction (an amount of change in the position of an observation target plane) and an amount of change in a target value (Step S83). For example, the arithmetic device 20 calculates the ratio of the difference between the two pieces of depth information obtained in Step S82 (an amount of movement of the observation target plane $\Delta D$) to the difference between the two target values obtained in Step S82 (an amount of change in target value $\Delta\theta$). In other words, the arithmetic device 20 calculates a change rate $\Delta D/\Delta\theta$ that is a slope of a graph at the target position.

Finally, the arithmetic device 20 calculates a refractive index of the sample S at the target position on the basis of the relationship calculated in Step S83 (Step S84). For example, on the basis of a function F of a change rate and a refractive index, that is stored in the storage 25 and illustrated in FIG. 25, the arithmetic device 20 calculates a refractive index from the relationship (change rate) calculated in Step S83. The function F of a change rate and a refractive index varies according to an objective, so a function F of a change rate and a refractive index for each objective is preferably stored in the storage 25. Further, instead of the function F, data that indicates a relationship between a change rate and a refractive index may be stored in the storage 25.

When the refractive index is calculated and the processing of FIG. 24 is terminated, the microscopy system 1 displays refractive index information on the graph (Step S79). In this case, the arithmetic device 20 associates, with the graph, information on the refractive index of the sample S at the target position and displays them on the display device 30. In the present embodiment, for example, when a portion at a depth of 150 μm is specified as a target position by use of a pointer P, refractive index information I1 (1.53) is displayed, on the graph G1, near a point that corresponds to the target position, as illustrated in FIG. 26A. Further, when a portion at a depth of 400 μm is specified as a target position by use of the pointer P, refractive index information I2 (1.39) is displayed, on the graph G1, near a point that corresponds to the target position, as illustrated in FIG. 26B. The positions at depths of 150 μm and 400 μm are respectively included in the layer L1 (glass plate, refractive index of 1.52) and the layer L2 (silicone, refractive index of 1.4) illustrated in FIG. 22.

As described above, the microscopy system 1 according to the present embodiment permits a calculation of a refractive index of an arbitrary portion in a sample. For example, even when the sample has a complicated refractive index distribution, such as a laminated structure that is constituted of a plurality of layers having different refractive indexes, as illustrated in FIG. 22, it is possible to accurately calculate a refractive index of an arbitrary portion regardless of a structure of the sample. This will be described in detail later. Further, it is possible to calculate a refractive index of a deep portion of a sample without slicing the sample, which permits an in vivo measurement of a refractive index of a biological sample.

Further, in the microscopy system 1, a refractive index of a sample is calculated by use of information obtained by the correction collar 111 correcting for a spherical aberration. Thus, the refractive index can be measured while correcting for a spherical aberration and observing a deep portion of the sample. As a result, the microscopy system 1 is particularly suitable for using for an in vivo observation of a biological sample, in which a mitigation of damage to a sample is important.

Furthermore, in the microscopy system 1, a graph is displayed that indicates a relationship between a position of an observation target plane and a target value. The slope of the graph is dependent on the refractive index, so if the graph is displayed, the user is able to know, from the graph, a refractive index distribution of a sample, such as a biological sample, that has a refractive index that varies according to the depth. Further, if refractive index information is displayed on the graph, it is possible to know the refractive index more accurately. FIGS. 26A and 26B each illustrate an example in which only refractive index information at a specified target position (refractive index information I1, refractive index information I2) is displayed on the graph G1, but as illustrated in FIG. 27, refractive index information I3 that indicates a refractive index distribution of a sample may be displayed on the graph G1 regardless of whether a target position is specified. This results in displaying a refractive index at each depth of the sample, so it is possible to know the refractive index distribution of the sample more accurately.

FIG. 28 is a diagram for explaining a method for calculating a refractive index. Referring to FIG. 28, the following explains in detail that a refractive index of an arbitrary portion in a sample can be accurately calculated regardless of a structure of the sample.

An example in which, as illustrated in FIG. 28, the observation target plane is situated in a third layer that is the third layer from the objective 110 and that is constituted of a medium having a refractive index $n_3$ is described below. A first layer that is adjacent to the objective 110 and that is constituted of a medium having a refractive index $n_1$ is, for example, air or an immersion liquid. A second layer constituted of a medium having a refractive index $n_2$ and the third layer constituted of a medium having refractive index $n_3$ are, for example, a biological sample.

When an angle of incidence of a ray R from the objective 110 into an interface IF1 situated between the first layer and the second layer is $\theta_1$, an angle of exit from the interface IF1 is $\theta2$, and an angle of exit from an interface IF2 situated between the second layer and the third layer is $\theta3$, Formula (3) below is derived by Snell's law.

$$n_1 \sin \theta_1 = n_2 \sin \theta_2 = n_3 \sin \theta_3 \qquad (3)$$

Further, the following relationships are also geometrically derived from FIG. 28. D is a thickness of the second layer.

$$d_1 \tan \theta_1 = x_1$$

$$d_2 \tan \theta_2 = x_2$$

$$D \tan \theta_2 = x_1 - x_2$$

$$(d_1 - D + \delta) \tan \theta_3 = x_2$$

On the basis of these relationships, $\delta$ is represented by Formula (4) below.

$$\delta = d_2 \frac{\tan \theta_2}{\tan \theta_3} + D - d_1 \qquad (4)$$

Further, the following relationship is also geometrically derived from FIG. 28.

$$D \tan \theta_2 = x_1 - x_2$$
$$= d_1 \tan \theta_1 - d_2 \tan \theta_2$$

On the basis of this relationship, $d_2$ is represented by Formula (5) below.

$$d_2 = \left( \frac{d_1 \tan \theta_1}{\tan \theta 2} - D \right) \qquad (5)$$

Further, when Formula (4) is modified using Formula (5), Formula (6) is derived.

$$\delta = \left( \frac{d_1 \tan \theta_1}{\tan \theta 2} - D \right) \frac{\tan \theta_2}{\tan \theta_3} + D - d_1 \qquad (6)$$
$$= d_1 \left( \frac{\tan \theta_1}{\tan \theta_3} - 1 \right) - D \left( \frac{\tan \theta_2}{\tan \theta_3} - 1 \right)$$

Here, the following relationships are derived from Formula (3).

$$\frac{\tan \theta_1}{\tan \theta_3} = \frac{\sin \theta_1 / \cos \theta_1}{\sin \theta_3 / \cos \theta_3} = \frac{\sin \theta_1 \sqrt{1 - \sin^2 \theta_3}}{\sin \theta_3 \sqrt{1 - \sin^2 \theta_1}} = \sqrt{\frac{n_3^2 - n_1^2 \sin^2 \theta_1}{n_1^2 - n_1^2 \sin^2 \theta_1}}$$

$$\frac{\tan \theta_2}{\tan \theta_3} = \frac{\sin \theta_2 / \cos \theta_2}{\sin \theta_3 / \cos \theta_3} = \frac{\sin \theta_2 \sqrt{1 - \sin^2 \theta_3}}{\sin \theta_3 \sqrt{1 - \sin^2 \theta_2}} = \sqrt{\frac{n_3^2 - n_1^2 \sin^2 \theta_1}{n_2^2 - n_1^2 \sin^2 \theta_1}}$$

When Formula (6) is modified using these relationships, Formula (7) is derived.

$$\delta = d_1 \left( \sqrt{\frac{n_3^2 - n_1^2 \sin^2 \theta_1}{n_1^2 - n_1^2 \sin^2 \theta_1}} - 1 \right) - D \left( \sqrt{\frac{n_3^2 - n_1^2 \sin^2 \theta_1}{n_2^2 - n_1^2 \sin^2 \theta_1}} - 1 \right) \qquad (7)$$

When D=0, $\delta$ is not dependent on the parameter of the second layer. Further, when $\theta_1$=0, Formula (7) is dependent only on a refractive index difference (refractive index ratio). The amount of paraxial movement $\delta_0$ that is $\delta$ when $\theta_1$=0 is represented by Formula (8).

$$\delta_0 \equiv \delta(\theta_1 = 0) \qquad (8)$$
$$= d_1 \left( \frac{n_3}{n_1} - 1 \right) - D \left( \frac{n_3}{n_1} - 1 \right)$$

An amount of spherical aberration $\Delta$ that occurs in the ray R is a difference between $\delta$ and $\delta_0$. Thus, Formula (9) is derived from Formula (7) and Formula (8). An amount of spherical aberration that occurs in the microscope apparatus is calculated by integrating Formula (9) with respect to $\theta_1$ from 0 to a maximum incident angle $\theta_{MAX}$ determined by an NA of the objective 110.

$$\Delta = d_1 \left( \sqrt{\frac{n_3^2 - n_1^2 \sin^2 \theta_1}{n_1^2 - n_1^2 \sin^2 \theta_1}} - \frac{n_3}{n_1} \right) - D \left( \sqrt{\frac{n_3^2 - n_1^2 \sin^2 \theta_1}{n_2^2 - n_1^2 \sin^2 \theta_1}} - \frac{n_3}{n_1} \right) \qquad (9)$$

Further, Formula (10) is derived by differentiating Formula (9) with respect to $d_1$. Formula (10) represents a rate of change in the amount of spherical aberration that is defined by an amount of change in the amount of spherical aberration per amount of change in the depth of an observation target plane.

$$\frac{d\Delta}{dd_1} = \sqrt{\frac{n_3^2 - n_1^2 \sin^2 \theta_1}{n_1^2 - n_1^2 \sin^2 \theta_1}} - \frac{n_3}{n_1} \qquad (10)$$

Formula (10) does not include the parameter of the second layer. From this, it is understood that the rate of change in the amount of spherical aberration is dependent on the first layer and the third layer that includes an observation target plane, and is not affected by the second layer that is an intermediate layer. Further, $\theta_1$ is an integration variable. $n_1$ is a refractive index of a medium placed between the objective 110 and the sample S, and is generally determined according to the objective 110. In view of the foregoing, it is understood that a refractive index $n_3$ of the third layer that includes an observation target plane can be calculated using Formula (10) if the rate of change in the amount of spherical aberration is determined. As a result, if the rate of change in the amount of spherical aberration is determined, a refractive index of an arbitrary portion can be accurately calculated regardless of a structure of the sample.

In the microscopy system 1, a rate of change in target value of the correction collar 111 (a relationship between an amount of movement of the observation target plane and an amount of change in target value) is calculated instead of directly calculating a rate of change in the amount of spherical aberration. When an objective is fixed, a relationship between a target value and an amount of spherical aberration remains a known constant relationship, so it is possible to change the rate of change in spherical aberration to the rate of change in target value. Thus, also in the microscopy system 1 that calculates a refractive index from a rate of change in target value, it is possible to accurately calculate a refractive index of an arbitrary portion regardless of a structure of a sample.

Figure 29:
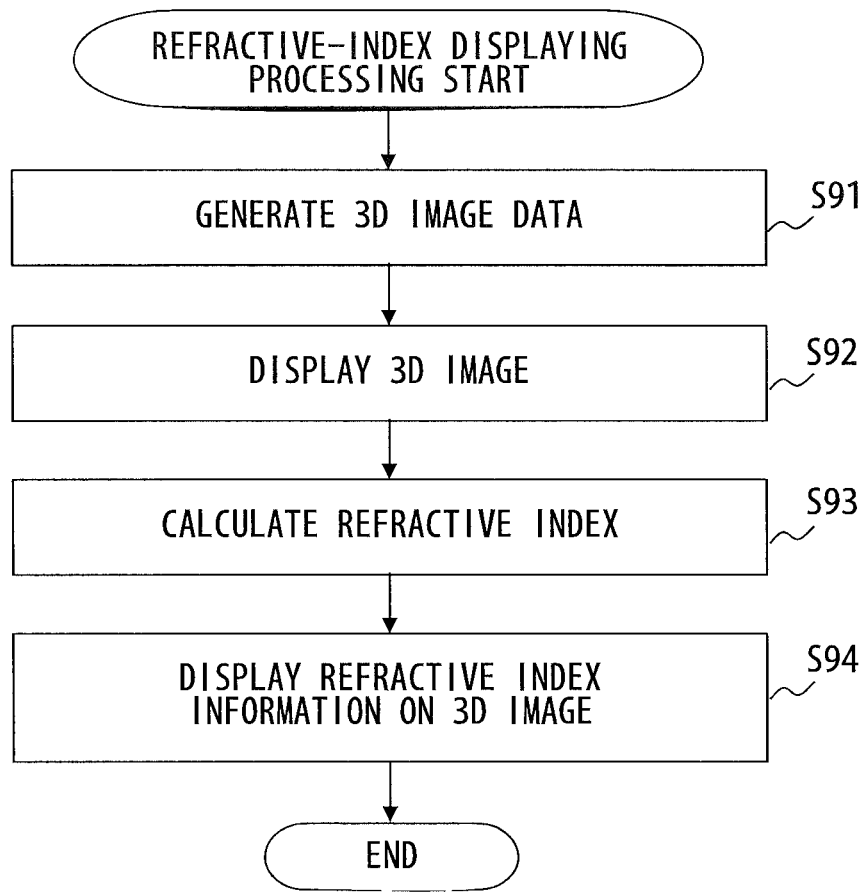
FIG. 29 is a flowchart of another refractive-index displaying processing.
Figure 30:
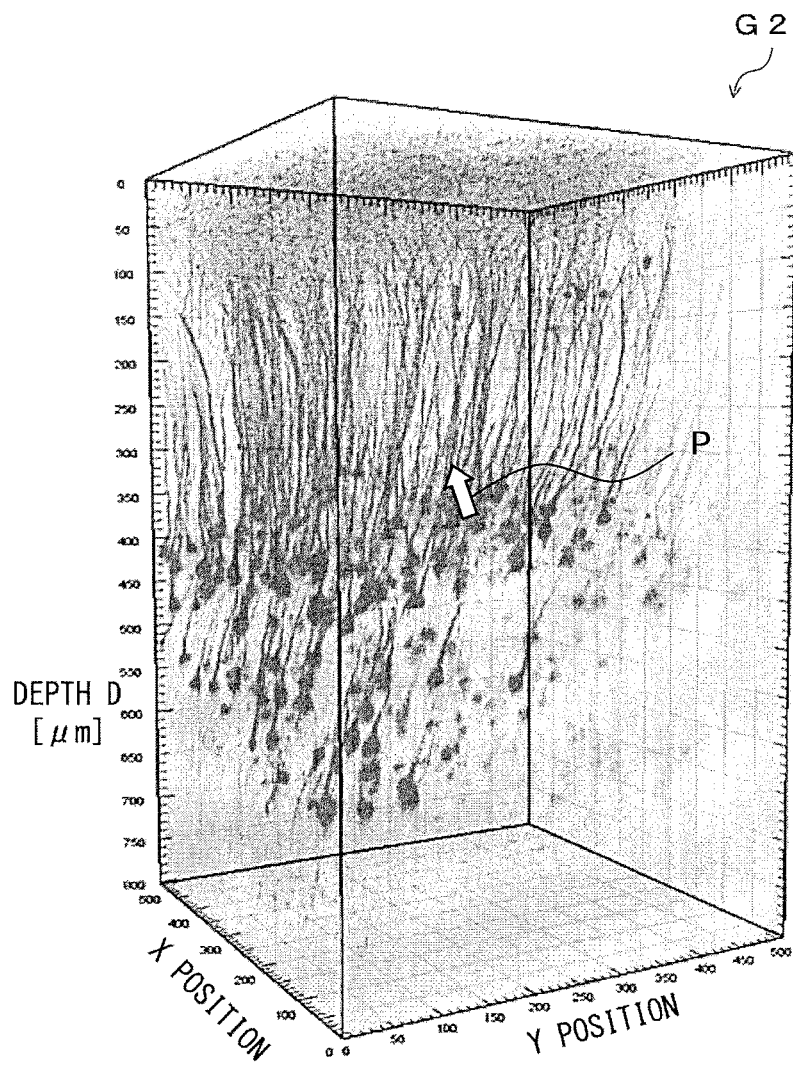
FIG. 30 illustrates an example of a three-dimensional image displayed on the display device of FIG. 1.

FIG. 29 is a flowchart of another refractive-index displaying processing performed in the microscopy system 1. FIG. 30 illustrates an example of a three-dimensional image G2 displayed on the display device 30. FIG. 31 illustrates the three-dimensional image G2 on which refractive index information at a target position is displayed. FIG. 32 illustrates the three-dimensional image on which the refractive index information and a graph are displayed. The refractive-index displaying processing of displaying refractive index information on a three-dimensional image is described below with reference to FIGS. 29 to 32. In this case, the sample S is a mouse brain.

The microscopy system 1 generates three-dimensional image data of the sample S (Step S91). In this case, the microscopy system 1 performs the Z-stack image-capturing processing of FIG. 4, 15, or 17 described above, and the arithmetic device 20 generates three-dimensional image data of the sample S on the basis of a plurality of pieces of image data obtained as a result of the Z-stack image-capturing processing.

Next, the microscopy system 1 displays a three-dimensional image of the sample S (Step S92). In this case, on the basis of the three-dimensional image data of the sample S, the arithmetic device 20 displays the three-dimensional image of the sample S on the display device 30. In the present embodiment, for example, a three-dimensional image G2 of a mouse brain in which there is a change in structure in a depth direction is displayed, as illustrated in FIG. 30.

Using a pointer P, a user specifies a point on the three-dimensional image G2 displayed on the display device 30, and when a target position in the sample S is specified as a result of specifying the point, the microscopy system 1 calculates a refractive index of the sample S at the target position (Step S93). This processing is similar to the refractive-index displaying processing of FIG. 24. However, in Step S82, a plurality of target values and a plurality of pieces of depth information are obtained by moving the observation target plane to a plurality of positions in the vicinity of the depth of the target position and by calculating a target value at each of the plurality of positions.

When the refractive index is calculated, the microscopy system 1 displays refractive index information on the three-dimensional image G2 (Step S94). In this case, the arithmetic device 20 associates, with the three-dimensional image G2, information on the refractive index of the sample S at the target position and displays them on the display device 30. In the present embodiment, for example, refractive index information I4 (1.38) is displayed at the target position on the three-dimensional image G2, as illustrated in FIG. 31.

As described above, the microscopy system 1 can associate, with a three-dimensional image, a refractive index of the sample S at a target position and display them. This makes it possible to easily know a relationship between a structure of the sample S and a refractive index. Further, a target position can be specified while viewing an image, so it is possible to specify with certainty a portion for which a refractive index needs to be known. Furthermore, it may be configured such that a user can specify a target range having a width in a depth direction while viewing a three-dimensional image. Then, a relationship between an amount of movement of the observation target plane and an amount of change in target value within the target range may be calculated, so as to calculate a refractive index distribution within the target range.

Further, the refractive-index displaying processing of FIG. 21 and the refractive-index displaying processing of FIG. 29 may be combined. For example, the processes of Step S71 to Step S76 of FIG. 21 may be performed before Step S91 of FIG. 29, so as to display refractive index information I5 and a graph on the three-dimensional image G2, as illustrated in FIG. 32. This makes it possible to know in more detail a relationship between a structure of the sample S and a refractive index.

Further, refractive index information is not limited to text-based information as illustrated in FIGS. 31 and 32. For example, refractive index information may be provided to a user by changing the color of the three-dimensional image G2. In this case, portions in the image that have different refractive indexes are represented by use of different colors. Further, the color of a graph may be changed instead of changing the color of an image itself. If refractive index information is provided using color, the user is able to grasp a refractive index more intuitively.

FIG. 33 is a flowchart of yet another refractive-index displaying processing performed in the microscopy system 1. The refractive-index displaying processing of displaying refractive index information on a two-dimensional image is described below with reference to FIG. 33.

First, the microscopy system 1 obtains medium information (Step S101). This processing is similar to Step S71 of FIG. 21. After that, the microscopy system 1 corrects for a spherical aberration (Step S102). In this case, the microscopy system 1 performs the target-value calculating processing of FIG. 5, 10, or 12 described above, calculates a target value, and changes the set value of the correction collar 111 to the calculated target value.

When the spherical aberration is corrected, the microscopy system 1 obtains two-dimensional image data of the sample S (Step S103). In this case, the microscope apparatus obtains image data of the sample S. Further, the microscopy system 1 calculates a refractive index (Step S104). In this case, the arithmetic device 20 calculates a refractive index of a current observation target plane of the sample S. This processing is similar to the refractive-index calculating processing of FIG. 24. However, in Step S82, a plurality of target values and a plurality of pieces of depth information are obtained by moving the observation target plane to a plurality of positions in the vicinity of the depth of the target position and by calculating a target value at each of the plurality of positions.

When the refractive index is calculated, the microscopy system 1 displays refractive index information on a two-dimensional image (Step S105). In this case, the arithmetic device 20 associates, with the two-dimensional image obtained in Step S103, information on the refractive index of the sample S and displays them on the display device 30.

As described above, the microscopy system 1 can display refractive index information on a two-dimensional image. This enables a user to know a refractive index of an observation target plane while observing a sample.

Second Embodiment

FIG. 34 illustrates an example of a configuration of a microscope 200 according to the present embodiment. A microscopy system according to the present embodiment is different from the microscopy system 1 of FIG. 1 in that it includes the microscope 200 instead of the microscope 100. It is similar to the microscopy system 1 in regard to the other points, so similar reference numerals are used to denote similar components.

The microscope 200 is a confocal microscope that is a form of a scanning microscope. The sample S is, for example, a biological sample of a mouse brain. As illustrated in FIG. 34, the microscope 200 includes, in an illumination light path, a laser 201, a beam expander 202, a dichroic mirror 203, a scanning unit 204, a pupil-projection optical system 205, and the objective 110. The objective 110, the Z driving unit 109 that moves the objective 110 in the optical-axis direction, and the correction collar 111 that is a correction device that moves a lens in the objective 110 so as to correct for a spherical aberration are similar to those of the microscope 100 according to the first embodiment.

The laser 201 emits, for example, a laser beam in a visible region, in an ultraviolet region, or in an infrared region. The output of a laser emitted from the laser 201 is controlled by the light source controller 11. The beam expander 202 is an optical system that adjusts a flux of a laser beam (a collimated beam) from the laser 201 according to a pupil diameter of the correction collar 111. The dichroic mirror 203 is a light separator that separates an excitation light (a laser beam) and a detected light (fluorescence) from the sample S, and separates a laser beam and fluorescence on the basis of a wavelength.

The scanning unit 204 is a scanner that two-dimensionally scans the sample S with a laser beam, and includes, for example, a galvanometer scanner or a resonant scanner. A zoom magnification changes if a scan range of the scanning unit 204 changes. The scan range of the scanning unit 204 is controlled by the zoom controller 12. The pupil-projection optical system 205 is an optical system that projects the scanning unit 204 onto the objective 110 at its pupil position.

The microscope 200 further includes, in a detection light path (a transmission light path of the dichroic mirror 203), a mirror 206, a confocal lens 207, a confocal aperture 208, a light collecting lens 209, and a photodetector 210. A signal output from the photodetector 210 is output to an A/D converter 211.

The confocal lens 207 is a lens that collects fluorescence on the confocal aperture 208. The confocal aperture 208 is an aperture arranged in a position optically conjugate with a focal plane of the objective 110. A pinhole that transmits fluorescence that occurs from a focal position of the objective 110 is formed in the confocal aperture 208. The light collecting lens 209 is a lens that guides, to the photodetector 210, fluorescence that passes through the confocal aperture 208.

The photodetector 210 is, for example, a photomultiplier tube (PMT), and outputs an analog signal according to an amount of incident fluorescence. The A/D converter 211 converts an analog signal from the photodetector 210 into a digital signal (a brightness signal) and outputs it to the arithmetic device 20.

In the microscopy system having the above-described configuration according the present embodiment, the microscope 200 scans the sample S with a laser beam using the scanning unit 204, and detects fluorescence from each position of the sample S using the photodetector 210. Then, the arithmetic device 20 generates image data on the basis of a digital signal (brightness signal) obtained by converting a signal from the photodetector 210, and on the basis of scanning information on the scanning unit 204. In other words, in the microscopy system according to the present embodiment, the microscope apparatus constituted of the microscope 200 and the arithmetic device 20 obtains image data of the sample S.

The microscopy system according to the present embodiment permits performing of Z-stack image-capturing processing and refractive-index displaying processing that are similar to those of the microscopy system 1 according to the first embodiment.

Third Embodiment

Figure 35:
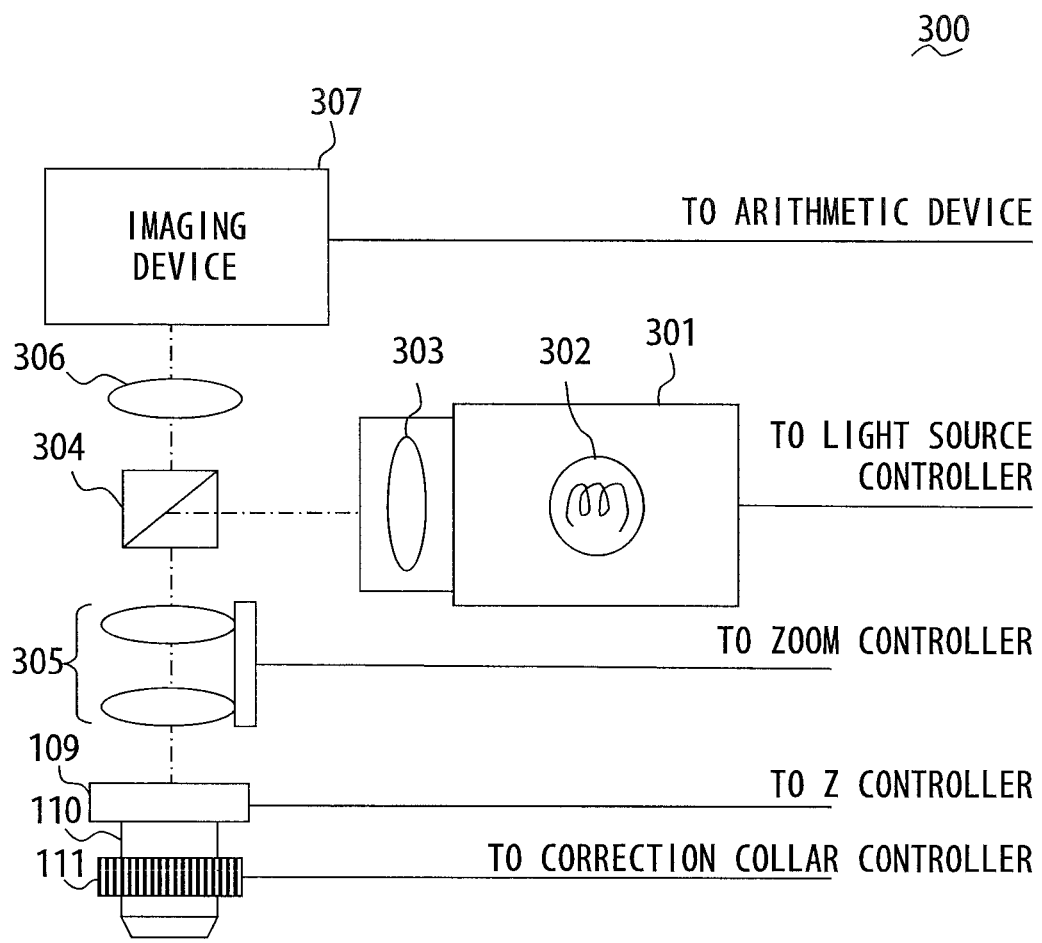
FIG. 35 illustrates an example of a configuration of a microscopy system according to a third embodiment.

FIG. 35 illustrates an example of a configuration of a microscope 300 according to the present embodiment. A microscopy system according to the present embodiment is different from the microscopy system 1 of FIG. 1 in that it includes the microscope 300 instead of the microscope 100. It is similar to the microscopy system 1 in regard to the other points, so similar reference numerals are used to denote similar components.

The microscope 300 is a common fluorescence microscope, but not a scanning one. The microscope 300 has a zoom function, so it is also called a zooming microscope. The sample S is, for example, a biological sample of a mouse brain. As illustrated in FIG. 35, the microscope 300 includes, in an illumination light path, a lamp house 301 having a light source 302 built in, a collector lens 303, a fluorescence cube 304, a zoom lens 305, and the objective 110. The objective 110, the Z driving unit 109 that moves the objective 110 in the optical-axis direction, and the correction collar 111 that is a correction device that moves a lens in the objective 110 so as to correct for a spherical aberration are similar to those of the microscope 100 according to the first embodiment.

The light source 302 is, for example, an LED light source or a high-power mercury lamp. The output of the light source 302 is controlled by the light source controller 11. The collector lens 303 collimates an excitation light from the light source 302. The fluorescence cube 304 includes a dichroic mirror, an excitation filter, and an absorption filter (none of which are shown). The fluorescence cube 304 is a light separator that separates an excitation light and a detected light (fluorescence) from the sample S, and separates an excitation light and fluorescence on the basis of a wavelength.

The zoom lens 305 is configured such that a distance between lenses that constitute the zoom lens 305 is changed. The zoom controller 12 changes the distance between the lenses using, for example, a motor (not shown) so that a zoom magnification is changed. In other words, the zoom lens 305 is controlled by the zoom controller 12.

The microscope 300 further includes a tube lens 306 and an imaging device 307 in a detection light path (a transmission light path of the fluorescence cube 304). The tube lens 306 collects, on the imaging device 307, fluorescence that is incident through the objective 110 and the zoom lens 305, and forms an optical image of the sample S. The imaging device 307 is, for example, a CCD camera, which captures an optical image of the sample S and generates image data of the sample S. The imaging device 307 outputs the generated image data to the arithmetic device 20. In the microscopy system according to the present embodiment, a microscope apparatus, that is, the microscope 300, obtains image data of the sample S.

The microscopy system according to the present embodiment permits performing of Z-stack image-capturing processing and refractive-index displaying processing that are similar to those of the microscopy system 1 according to the first embodiment.

The embodiments described above are just examples to facilitate understanding of the present invention, and the embodiment of the present invention is not limited to these embodiments. Various modifications and alterations may be made to a microscopy system, a calculation method, and a calculation program without departing from the invention specified in the claims. A combination of some of the features in the embodiments described herein may be provided as a single embodiment.

As an example, the configuration in which the Z controller 13 controls the Z driving unit 109 so as to change the position of an observation target plane has been described, but the Z controller 13 may move the stage of the microscope in the optical-axis direction so as to change the position of an observation target plane.

Further, the correction collar 111 has been described as an example of a correction device that corrects for a spherical aberration that varies according to the depth of an observation target plane, but it is sufficient if the correction device can change the amount of spherical aberration that occurs in a light path. The correction device may be, for example, a device that uses an LCOS (Liquid Crystal on Silicon™), a DFM (deformable mirror), or a liquid lens. Further, when an amount of spherical aberration that occurs is large and the spherical aberration is not sufficiently corrected by a single correction device, the amount of spherical aberration to be corrected may be shared by a plurality of correction devices so as to correct for the spherical aberration that occurs in an observation target plane.

As a method for calculating an evaluation value, the example in which one piece of image data is obtained for each set value so as to obtain an evaluation value for each piece of image data obtained has been described, but a plurality of pieces of image data may be obtained for each set value so as to calculate an evaluation value from the plurality of pieces of image data using, for example, a Kalman filter. In this method, it is possible to cancel out noise components included in pieces of image data using the plurality of pieces of image data for each set value, which permits a calculation of a more accurate evaluation value.

Further, the description has been provided on the assumption that a scanning method executed by a scanner is raster scanning, which is a most common scanning method, but the scanning method is not limited to raster scanning, and it may be, for example, tornado scanning in which a sample is scanned spirally.

What is claimed is:
1. A microscopy system comprising:
a microscope apparatus comprising an objective and a correction device configured to correct for a spherical aberration and to obtain image data; and
a computer configured to:
estimate, on the basis of information on a medium placed between the objective and an observation target plane, an amount of spherical aberration that occurs in the microscope apparatus; and
calculate a target set value for each depth of the observation target plane by use of a contrast value calculated from the image data obtained by the microscope apparatus and an amount of spherical aberration that is estimated, the target set value being a set value of the correction device, the set value corresponding to the amount of spherical aberration that occurs in the microscope apparatus,
wherein the computer is configured to:
calculate, on the basis of a plurality of contrast values calculated from a plurality of pieces of image data, the target set value at a measured depth that is a depth of the observation target plane when the microscope apparatus obtains the plurality of pieces of image data in the plurality of states in which different set values are set in the correction device; and
calculate, on the basis of the target set value at the measured depth and the amount of spherical aberration that is estimated, the target set value at a depth of the observation target plane that is other than the measured depth.

2. The microscopy system according to claim 1,
wherein the computer is configured to calculate, on the basis of an estimation set value and the target set value at the measured depth, a correction function that represents the target set value for each depth of the observation target plane, the estimation set value being a set value of the correction device and corresponding to the amount of spherical aberration that is estimated.

3. The microscopy system according to claim 2,
wherein the computer is configured to calculate the correction function by modifying, on the basis of the target set value at the measured depth, an estimation function that represents the estimation set value for each depth of the observation target plane.

4. The microscopy system according to claim 1,
wherein the microscope apparatus is configured to obtain the plurality of pieces of image data in a plurality of states each determined on the basis of the amount of spherical aberration that is estimated by the computer.

5. The microscopy system according to claim 1,
wherein the microscope apparatus is a scanning microscope apparatus comprising a scanner, and is configured to obtain image data for calculating a contrast value in a second setting of the scanner that is different from a first setting of the scanner that is used to obtain image data for observation.

6. The microscopy system according to claim 5,
wherein the second setting is a setting in which a portion of scanning performed by the scanner is left out.

7. The microscopy system according to claim 5,
wherein a number of scanning lines in the second setting is a number of lines that is determined on the basis of a sample of the image data for calculating a contrast value, a magnification of the objective, and a zoom magnification of the scanner.

8. The microscopy system according to claim 1 further comprising an input device that inputs information on a medium placed between the objective and an observation target plane.

9. The microscopy system according to claim 1,
wherein the correction device comprises a correction collar that moves a lens in the objective.

10. A determination method comprising:
obtaining image data using a microscope apparatus comprising an objective and a correction device configured to correct for a spherical aberration;
estimating, on the basis of information on a medium placed between the objective and an observation target plane, an amount of spherical aberration that occurs in the microscope apparatus; and
calculating a set value of the correction device for each depth of the observation target plane by use of a contrast value calculated from the image data and an estimated amount of spherical aberration, the set value of the correction device corresponding to the amount of spherical aberration that occurs in the microscope apparatus, wherein the calculating the set value of the correction device for each depth of the observation target plane comprises:
   calculating, on the basis of a plurality of contrast values calculated from a plurality of pieces of image data, the target set value at a measured depth that is a depth of the observation target plane when the microscope apparatus obtains the plurality of pieces of image data in the plurality of states in which different set values are set in the correction device; and
   calculating, on the basis of the target set value at the measured depth and the amount of spherical aberration that is estimated, the target set value at a depth of the observation target plane that is other than the measured depth.

11. A non-transitory recording medium having stored therein a program that causes a computer to execute a process comprising:
   calculating a contrast value from image data obtained by a microscope apparatus comprising an objective and a correction device configured to correct for a spherical aberration;
   estimating, on the basis of information on a medium placed between the objective and an observation target plane, an amount of spherical aberration that occurs in the microscope apparatus; and
   calculating a set value of the correction device for each depth of the observation target plane, by use of the contrast value calculated from the image data and an estimated amount of spherical aberration, the set value of the correction device corresponding to the amount of spherical aberration that occurs in the microscope apparatus,
wherein the calculating the set value of the correction device for each depth of the observation target plane comprises:
   calculating, on the basis of a plurality of contrast values calculated from a plurality of pieces of image data, the target set value at a measured depth that is a depth of the observation target plane when the microscope apparatus obtains the plurality of pieces of image data in the plurality of states in which different set values are set in the correction device; and
   calculating, on the basis of the target set value at the measured depth and the amount of spherical aberration that is estimated, the target set value at a depth of the observation target plane that is other than the measured depth.

* * * * *